(12) United States Patent
Soliman

(10) Patent No.: US 11,732,201 B2
(45) Date of Patent: Aug. 22, 2023

(54) PROCESS CONTROL SYSTEMS AND METHODS FOR SIMULTANEOUS CRUDE OIL DEHYDRATION, DESALTING, SWEETENING, AND STABILIZATION WITH INDIRECT RECYCLE HEATING

(71) Applicant: Saudi Arabian Oil Company, Dhahran (SA)

(72) Inventor: Mohamed Soliman, Ras Tanura (SA)

(73) Assignee: Saudi Arabian Oil Company, Dhahran (SA)

( * ) Notice: Subject to any disclaimer, the term of this patent is extended or adjusted under 35 U.S.C. 154(b) by 95 days.

(21) Appl. No.: 17/330,077

(22) Filed: May 25, 2021

(65) Prior Publication Data
US 2022/0380687 A1 Dec. 1, 2022

(51) Int. Cl.
  *C10G 53/02* (2006.01)
  *B01D 19/00* (2006.01)
  (Continued)

(52) U.S. Cl.
  CPC ........... *C10G 53/02* (2013.01); *B01D 17/045* (2013.01); *B01D 19/001* (2013.01); *B01D 19/0057* (2013.01); *B01D 19/0063* (2013.01); *B01D 53/265* (2013.01); *C10G 31/08* (2013.01); *C10G 33/02* (2013.01); *C10G 33/08* (2013.01);
  (Continued)

(58) Field of Classification Search
  CPC ........ C10G 31/08; C10G 33/02; C10G 33/08; C10G 53/02; B01D 17/045; B01D 19/0057; B01D 19/0063
  See application file for complete search history.

(56) References Cited

U.S. PATENT DOCUMENTS 4,180,457 A   12/1979 Popp et al.
8,790,509 B2   7/2014 Vu
(Continued)

FOREIGN PATENT DOCUMENTS

CN   109370641 A   2/2019
EP   2497556 B1   12/2018

OTHER PUBLICATIONS

Al-Zahrani et al., "Maximizing Crude Yield of Surface Production Facilities/GOSPs by Process Optimization", International Petroleum Technology Conference, 2020.
(Continued)

*Primary Examiner* — Renee Robinson
(74) *Attorney, Agent, or Firm* — Bracewell LLP; Constance G. Rhebergen; Eleanor L. Tyson

(57) ABSTRACT

Systems and methods for crude oil separations including degassing, dewatering, desalting, and stabilization, one method including separating crude oil into a crude oil off-gas and a partially degassed crude oil output; compressing the crude oil off-gas; applying the compressed crude oil off-gas for indirect heating of the partially degassed crude oil output; further heating the partially degassed crude oil output indirectly with compressed low pressure gas; directly mixing with the partially degassed crude oil output a compressed atmospheric pressure gas; separating from the partially degassed crude oil output a low pressure gas for use in the step of further heating; and separating from the partially degassed crude oil output an atmospheric pressure gas for use in the step of directly mixing.

15 Claims, 3 Drawing Sheets

(51) Int. Cl.
  *B01D 53/26* (2006.01)
  *C10G 31/08* (2006.01)
  *C10G 33/02* (2006.01)
  *C10G 33/08* (2006.01)
  *B01D 17/04* (2006.01)

(52) U.S. Cl.
  CPC . *C10G 2300/207* (2013.01); *C10G 2300/208* (2013.01); *C10G 2300/4006* (2013.01); *C10G 2300/4012* (2013.01)

(56) References Cited

U.S. PATENT DOCUMENTS

| | | |
|---|---|---|
| 10,023,811 B2 | 7/2018 | Soliman et al. |
| 10,260,010 B2 | 4/2019 | Soliman |
| 10,513,663 B2 | 12/2019 | Soliman et al. |
| 10,767,121 B2 | 9/2020 | Soliman |
| 10,808,180 B2 | 10/2020 | Soliman et al. |
| 2013/0213085 A1* | 8/2013 | Ward .................. C10L 3/10 62/618 |
| 2017/0175008 A1 | 6/2017 | Sprenkel et al. |
| 2017/0369791 A1 | 12/2017 | Khan et al. |
| 2018/0066194 A1 | 3/2018 | Soliman et al. |
| 2018/0187095 A1 | 7/2018 | Soliman |
| 2018/0195010 A1* | 7/2018 | Salu .................. C10G 31/08 |
| 2019/0300800 A1 | 10/2019 | Salu et al. |

OTHER PUBLICATIONS

Kokal et al., "Performance Appraisals of Gas/Oil-Separation Plants", SPE Production & Operations, pp. 287-296, May 2008.
Soliman et al., "Innovative Integrated and Compact Gas Oil Separation Plant for Upstream Surface Facilities", Offshore Technology Conference, 2020.
International Search Report and Written Opinion for International Application No. PCT/US2022/030442, report dated Sep. 20, 2022; pp. 1-13.

* cited by examiner

PROCESS CONTROL SYSTEMS AND METHODS FOR SIMULTANEOUS CRUDE OIL DEHYDRATION, DESALTING, SWEETENING, AND STABILIZATION WITH INDIRECT RECYCLE HEATING

BACKGROUND

Field

The present disclosure relates to gas oil separation plant (GOSP) technology. In particular, the disclosure relates to integrated process control for crude oil desalting, dehydration, sweetening, and stabilization with indirect recycle heating to create efficient GOSP systems and processes to aid in crude oil separations.

Description of Related Art

In general, a GOSP is a continuous separation process used to refine crude oil that includes a high pressure production trap (HPPT), a low pressure production trap (LPPT), a low pressure degassing tank (LPDT), a dehydrator unit, first and second stage desalting units, a water/oil separation plant (WOSEP), a stabilizer column, centrifugal pumps, heat exchangers, and reboilers. In a GOSP, the pressure is often reduced in several stages to allow the controlled separation of volatile components, such as entrained vapors. Goals of a GOSP include achieving maximum liquid recovery with stabilized oil separated from gas, and water separated from gases and oil. In other words, one purpose of a GOSP is to remove water, salt, and volatile hydrocarbon gases from wet crude oil after it is obtained from a hydrocarbon-bearing reservoir.

However, a large pressure reduction in a single separator will cause flash vaporization, leading to instability and safety hazards. Thus, in prior art GOSP's, many stages and units are required, as described in U.S. Pat. Nos. 10,260,010 and 10,023,811, incorporated herein by reference in their entirety. In a first stage, gas, crude oil, and free water are separated. In a second stage, crude oil is dehydrated and desalted to separate emulsified water and salt to meet certain basic sediment and water (BS&W) specifications. In a third stage, crude oil is stabilized and sweetened to meet hydrogen sulfide ($H_2S$) and Reid Vapor Pressure (RVP) specifications.

GOSP's are oftentimes operated to meet the following specifications: (1) a salt concentration of not more than about 10 pound (lbs.) of salt/1000 barrels (PTB); (2) BS&W content of not more than about 0.3 volume percent (V %); (3) $H_2S$ content (concentration) of less than about 60 ppm in either the crude stabilization tower (or degassing vessels in the case of sweet crude not requiring stabilization), for example between about 20-60 ppmw $H_2S$; and (4) a maximum RVP of about 7 pounds per square inch absolute (psia) and a maximum true vapor pressure (TVP) of about 13.5 psia at 130 degrees Fahrenheit (° F.).

Currently, there is no effective and inexpensive application of online analyzers for real-time monitoring of salt content in treated crude oil. Available online salt-in-crude analyzers are generally expensive and require frequent maintenance, along with the use of solvents. Xylene and alcohols are generally added to treated crude samples in measurable quantities, and the conductivity is measured, which is proportional to the salt content. The frequent replacement of chemicals and the presence of moving parts in the analyzers makes the analyzers labor-intensive, and the analyzers require frequent maintenance. Online nuclear and radioactive-based salt-in-crude analyzers also require frequent, expensive maintenance and measurements are generally unreliable. Due to these deficiencies, off-spec crude in between salt-in-crude measurements is common. Therefore, reliable, real-time, online measurements are needed in GOSP systems and methods for control to reach required dehydration and salt-in-crude specifications.

SUMMARY

The present disclosure describes integrated GOSP systems and processes with unique process control strategies with compressed gas recycle for indirect heating to meet crude oil export specifications and use less processing units than prior art GOSP's. Disclosed embodiments provide robust process control strategies to continuously measure and control the salinity (salt-in-crude content) of one or more dry crude oil stream exiting a crude oil separation unit, such as a desalter or dehydrator, in a GOSP or refinery using innovative and reliable oil-water emulsion interface level management. Online, real-time measurements of salt-in-crude content can be used to control and optimize wet crude handling units to meet the export dry crude specification of 10 lbs. of salt per 1000 barrel of dry crude (PTB) at minimum cost. Systems and methods of the present disclosure can achieve crude oil export specifications including: (1) a salt concentration of not more than about 10 PTB; (2) BS&W content of not more than about 0.3 V %; (3) $H_2S$ content of less than about 60 ppm in either the crude stabilization tower (or degassing vessels in the case of sweet crude not requiring a stabilization tower), for example between about 20-60 ppmw $H_2S$; and (4) a maximum RVP of about 7 psia and a maximum TVP of about 13.5 psia at 130° F.

Embodiments of systems and methods of the disclosure provide the ability to separate and stabilize crude oils with "tight" emulsions and increased water cuts that existing GOSP systems and methods cannot separate and stabilize. In other words, conventional desalters can treat crude oils with a water cut between about 30% and about 35% by volume. However, embodiments of the present disclosure efficiently treat crude oils to remove water when the water cut is greater than about 35% by volume. Tight emulsion crude oil normally occurs in medium to heavy crude oils with American Petroleum Institute ("API") numbers less than about 29. Oil specific gravity in the API scale is typically used as a measure of oil quality. A higher API value indicates a lighter oil and, thus, a higher market value.

Water cut in oil production refers to the total volume of water in the crude oil stream divided by the total volume of crude oil and water. In other words, water cut percent is equal to the total volumetric flowrate of water divided by the volumetric flowrate of water and oil multiplied by 100. Water cut generally increases with the age of an oil well. For example, water cut at the beginning of the life of a well is around zero percent, but as the well ages, water cut can reach close to 100%.

In certain embodiments, systems and methods are provided to treat wet and sour, unstabilized crude oil to meet shipping and transport specifications by simultaneously dehydrating, desalting, stabilizing, and sweetening the crude oil. In some embodiments, three conventional stages of processing crude oil will be done in only one stage, system, or process. In some embodiments, crude oil desalting, dehydration, sweetening, and stabilization will be integrated within existing three phase separation vessels within a GOSP along with gas compression and gas recycle for indirect heating. Dehydrating crude oil involves the separation of formation water, while desalting includes washing the crude with fresh water in addition to or alternative to recycle water to meet the required salt content and BS&W. Recycled water can be used in disclosed systems and methods to reduce the amount of fresh wash water required.

Crude sweetening involves the removal of dissolved $H_2S$ from crude oil to meet specifications in a range of about 10-60 ppmw, while crude stabilization involves the removal of light ends from crude oil, mainly $C_1$-$C_4$ hydrocarbons to reduce the TVP to less than about 13 psia at 130° F. below atmospheric pressure, or in other words no vapor will flash under atmospheric conditions, making it safe for transportation and shipment. Stabilizing the crude can be achieved if crude is heated in multiple stages of separation drums working at increasing temperatures and reduced pressure.

In some embodiments, crude oil components can be separated in a series of separation vessels in which off-gases are removed from the separation vessels and compressed to heat incoming crude oil to enhance the separation, in particular focusing on systems and processes with 3-phase separation vessels including fully insulated electrostatic electrodes. In some embodiments the advantages of the systems and processes include eliminating certain existing crude oil stabilizer columns, eliminating crude oil stabilizer reboilers, eliminating crude oil charge pumps, eliminating $1^{st}$ and/or $2^{nd}$ stage desalters, and eliminating separate crude oil dehydrators. Systems and processes are compact and easily mobilized for deployment in small scale and offshore rig applications. Energy savings and efficiency can be increased by separating water before heating in a HPPT.

In embodiments of the present disclosure, the unique arrangement of an inline cyclonic separator, a first indirect heat exchanger applying recycled compressed gases, and a second indirect heat exchanger applying recycled compressed gases allows for advantageous treatment of inlet wild crude oil prior to a HPPT, which aids in de-watering, de-gassing, desalting, and stabilizing crude oil. In these embodiments, an atmospheric compressor after-cooler is not required, a hydrocarbon condensate pump is not required, a low pressure compressor aftercooler is not required, and recycled compressed gases used for indirect heating of incoming inlet crude oil increase product yield of treated crude oil. Recycled, compressed gases simultaneously heat inlet wild crude oil and improve emulsified water separation in units such as, for example, an HPPT and LPPT.

Therefore, disclosed herein are integrated gas oil separation plant systems with integrated process control, one system including a crude oil inlet feed stream; an inline cyclonic separator, wherein the inline cyclonic separator is fluidly coupled to the crude oil inlet feed stream and is operable to separate gas from crude oil in the crude oil inlet feed stream; a first indirect heat exchanger fluidly coupled to the inline cyclonic separator to heat the crude oil in the crude oil inlet feed stream; a second indirect heat exchanger fluidly coupled to the first indirect heat exchanger to heat the crude oil in the crude oil inlet feed stream; a direct mixer device fluidly coupled to the second indirect heat exchanger to mix compressed atmospheric gas directly with the crude oil in the crude oil inlet feed stream; a low pressure production trap (LPPT), where the LPPT is fluidly coupled to the direct mixer device; a low pressure degassing tank (LPDT), where the LPDT is fluidly coupled to the LPPT; an atmospheric pressure off-gas compressor fluidly coupled to the LPDT to compress off-gas from the LPDT for production of compressed atmospheric gas for the direct mixer device; a low pressure off-gas compressor fluidly coupled to the LPPT to compress off-gas from the LPPT for production of compressed low pressure gas for use in heating in the second indirect heat exchanger; and a high pressure off-gas compressor fluidly coupled to the inline cyclonic separator to compress off-gas from the inline cyclonic separator for production of compressed high pressure gas for use in heating in the first indirect heat exchanger.

In some embodiments, the system includes a low pressure knockout drum (KOD) fluidly coupled to the second indirect heat exchanger and fluidly coupled to the high pressure off-gas compressor to accept cooled gases from the second indirect heat exchanger, to remove gas condensates and water from the cooled gases from the second indirect heat exchanger, and to supply gas to the high pressure off-gas compressor. In other embodiments, the system includes a high pressure KOD fluidly coupled to the first indirect heat exchanger to accept cooled gases from the first indirect heat exchanger, to remove gas condensates and water from the cooled gases from the first indirect heat exchanger, and to supply gas to a natural gas treatment facility. Still in other embodiments, the atmospheric pressure off-gas compressor is further fluidly coupled to a crude oil stabilizer with reboilers to accept atmospheric off-gas from the crude oil stabilizer. In some embodiments, the atmospheric pressure off-gas compressor is further fluidly coupled to a treated crude oil export product tank to accept atmospheric off-gas from the treated crude oil export product tank.

Still in yet other embodiments, the atmospheric pressure off-gas compressor is further fluidly coupled to a crude oil stabilizer without reboilers and with stripping gas injection to accept atmospheric off-gas from the crude oil stabilizer without reboilers and with stripping gas injection. In certain embodiments, the stripping gas injection stream is operable to supply steam in addition to or alternative to an additional stripping gas low in $H_2S$ concentration relative to crude oil in the crude oil stabilizer, where the stripping gas stream is operable to lower concentration of $H_2S$ in crude oil in the crude oil stabilizer. In some embodiments, the system is operable to refine crude oil in the crude oil inlet feed stream to produce a refined crude oil product safe for storage and shipment meeting the following specifications: (1) a salt concentration of not more than about 10 pound (lbs.) of salt/1000 barrels (PTB); (2) basic sediment and water (BSW) of not more than about 0.3 volume percent (V %); (3) $H_2S$ concentration of less than about 60 ppm; and (4) a maximum RVP of about 7 pounds per square inch absolute (psia) and a maximum true vapor pressure (TVP) of about 13.5 psia at 130 degrees Fahrenheit (° F.).

In some embodiments, the system includes a multi-variable prediction controller operable to control variables selected from the group consisting of: demulsifier injection rate; wash water injection rate; wash water recycle rate; LPPT temperature; LPPT pressure; LPPT oil-in-water emulsion level; LPDT temperature; LPDT pressure; and LPDT oil-in-water emulsion level; and the system is operable to refine crude oil in the crude oil inlet feed stream to produce a refined crude oil product safe for storage and shipment meeting the following specifications: (1) a salt concentration of not more than about 10 pound (lbs.) of salt/1000 barrels (PTB); (2) basic sediment and water (BSW) of not more than about 0.3 volume percent (V %); (3) $H_2S$ concentration of less than about 60 ppm; and (4) a maximum RVP of about 7 pounds per square inch absolute (psia) and a maximum true vapor pressure (TVP) of about 13.5 psia at 130 degrees Fahrenheit (° F.). In some embodiments, the operating pressure within the LPPT is greater than operating pressure in the LPDT. Other embodiments include a crude oil charge pump, a trim heater, and a desalter following the LPDT and in fluid communication with the LPDT. Still in other embodiments, the operating pressure of the inline cyclonic separator is between about 50 psig and about 150 psig greater than the operating pressure of the LPPT.

In some embodiments of the system, the LPPT and LPDT comprise an inlet cyclonic separator, insulated electrostatic electrodes, and a weir, wherein oil-in-water emulsions are disposed proximate the weirs during operation. In some embodiments, the compressors do not require after coolers.

Additionally disclosed are integrated gas oil separation methods, one method including separating crude oil into a crude oil off-gas and a partially degassed crude oil output; compressing the crude oil off-gas to produce compressed crude oil off-gas; applying the compressed crude oil off-gas for indirect heating of the partially degassed crude oil output; further heating the partially degassed crude oil output indirectly with compressed low pressure gas; directly mixing with the partially degassed crude oil output a compressed atmospheric pressure gas; separating from the partially degassed crude oil output a low pressure gas for use in the step of further heating; and separating from the partially degassed crude oil output an atmospheric pressure gas for use in the step of directly mixing. Some embodiments of the method include the steps of removing from the low pressure gas condensates and water after the low pressure gas is cooled in the step of further heating, and supplying a portion of the low pressure gas to be compressed in the step of compressing the crude oil off-gas. Still other embodiments include the steps of removing from the crude oil off-gas gas condensates and water after the crude oil off-gas is cooled in the step of applying, and supplying a portion of the crude oil off-gas to a natural gas treatment facility. In other embodiments, the compressed atmospheric pressure gas comprises off-gas from a crude oil stabilizer with reboilers. In some embodiments, the compressed atmospheric pressure gas comprises off-gas from a treated crude oil export product tank.

In certain methods, the compressed atmospheric pressure gas comprises atmospheric off-gas from a crude oil stabilizer without reboilers and with a stripping gas injection stream. Still in other embodiments, the stripping gas injection stream is operable to supply steam in addition to or alternative to an additional stripping gas low in $H_2S$ concentration relative to crude oil in the crude oil stabilizer, where the stripping gas stream is operable to lower concentration of $H_2S$ in crude oil in the crude oil stabilizer. In some embodiments of the method, the method is operable to refine the crude oil to produce a refined crude oil product safe for storage and shipment meeting the following specifications: (1) a salt concentration of not more than about 10 pound (lbs.) of salt/1000 barrels (PTB); (2) basic sediment and water (BSW) of not more than about 0.3 volume percent (V %); (3) $H_2S$ concentration of less than about 60 ppm; and (4) a maximum RVP of about 7 pounds per square inch absolute (psia) and a maximum true vapor pressure (TVP) of about 13.5 psia at 130 degrees Fahrenheit (° F.). Still other embodiments include the step of applying a multi-variable prediction controller to control variables selected from the group consisting of: a demulsifier injection rate; a wash water injection rate; a wash water recycle rate; a low pressure production trap (LPPT) temperature; LPPT pressure; LPPT oil-in-water emulsion level; a low pressure degassing tank (LPDT) temperature; LPDT pressure; and LPDT oil-in-water emulsion level; and the method is operable to refine crude oil in the crude oil inlet feed stream to produce a refined crude oil product safe for storage and shipment meeting the following specifications: (1) a salt concentration of not more than about 10 pound (lbs.) of salt/1000 barrels (PTB); (2) basic sediment and water (BSW) of not more than about 0.3 volume percent (V %); (3) $H_2S$ concentration of less than about 60 ppm; and (4) a maximum RVP of about 7 pounds per square inch absolute (psia) and a maximum true vapor pressure (TVP) of about 13.5 psia at 130 degrees Fahrenheit (° F.).

In some embodiments of the method, the step of separating from the partially degassed crude oil output a low pressure gas comprises the use of a LPPT and where the step of separating from the partially degassed crude oil output an atmospheric pressure gas comprises the use of a LPDT, and wherein the operating pressure within the LPPT is greater than operating pressure in the LPDT. Still in other embodiments, the method includes the step of flowing a degassed crude oil product through a crude oil charge pump, a trim heater, and a desalter following the step of separating from the partially degassed crude oil output an atmospheric pressure gas.

In certain embodiments, the step of separating crude oil into a crude oil off-gas and a partially degassed crude oil output comprises the use of an inline cyclonic separator operating at a pressure between about 50 psig and about 150 psig greater than an operating pressure of an LPPT in the step of separating from the partially degassed crude oil output the low pressure gas. In some embodiments, the step of separating from the partially degassed crude oil output a low pressure gas comprises the use of an LPPT, wherein the step of separating from the partially degassed crude oil output an atmospheric pressure gas comprises the use of an LPDT, and wherein the LPPT and LPDT comprise an inlet cyclonic separator, insulated electrostatic electrodes, and a weir, wherein oil-in-water emulsions are disposed proximate the weirs during operation. In some embodiments of the method, the compression of gasses does not require after cooling.

BRIEF DESCRIPTION OF THE DRAWINGS

These and other features, aspects, and advantages of the disclosure will become better understood with regard to the following descriptions, claims, and accompanying drawings. It is to be noted, however, that the drawings illustrate only several embodiments of the disclosure and are therefore not to be considered limiting of the disclosure's scope as it can admit to other equally effective embodiments.

DETAILED DESCRIPTION

Figure 1:
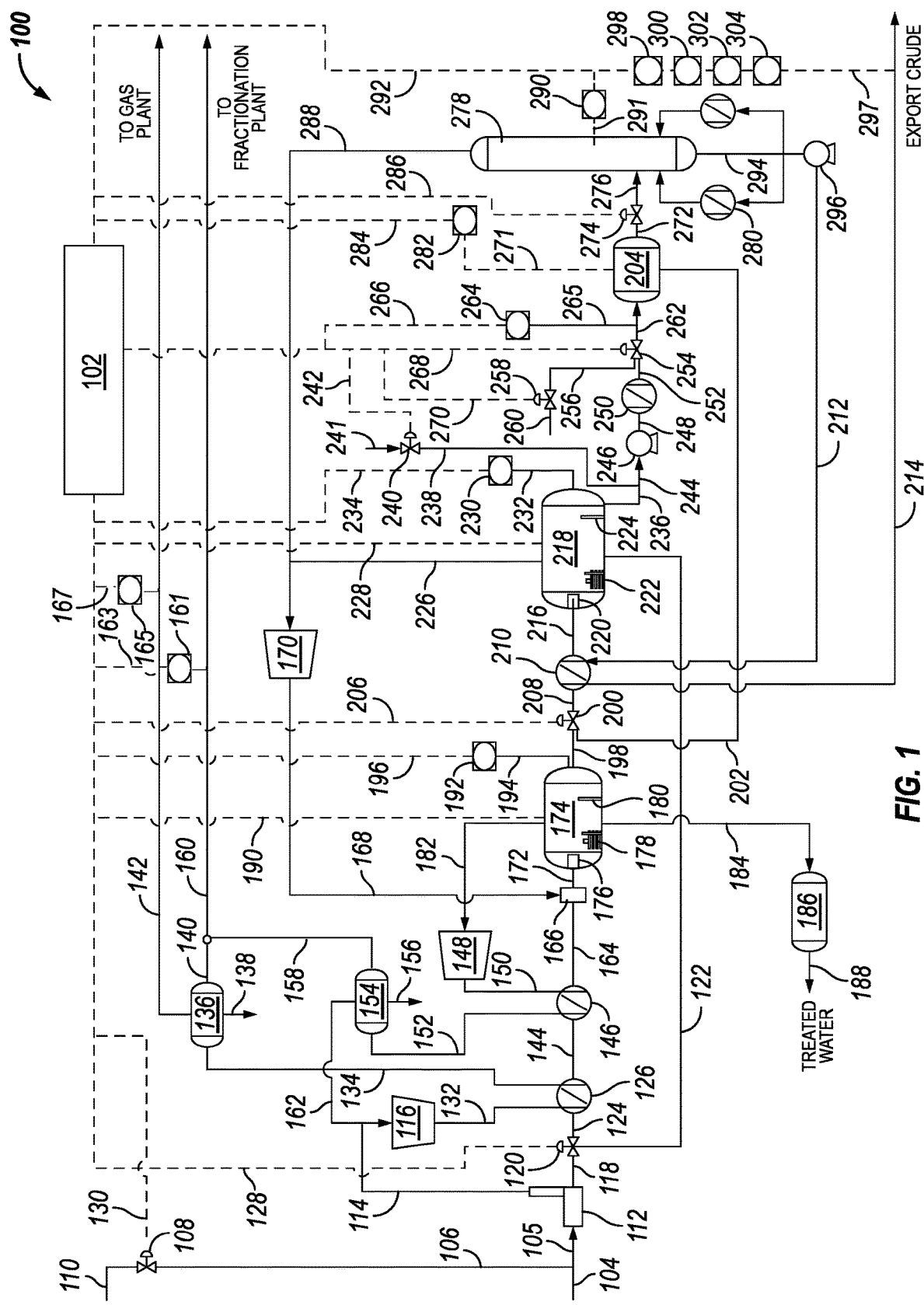
FIG. 1 is a schematic diagram showing an integrated GOSP of the present disclosure with optional real-time process control using a multivariable prediction controller (MPC) for controlling salt-in-crude content and water content of produced dry crude oil along with $H_2S$, RVP, and BS&W content, and applying recycle of compressed gases for indirect heating along with an inline cyclonic separator for sour crude oil.

While the disclosure will be described in connection with several embodiments, it will be understood that it is not intended to limit the disclosure to those embodiments. On the contrary, it is intended to cover all the alternatives, modifications, and equivalents as may be included within the spirit and scope of the disclosure defined by the appended claims.

Conventional GOSP's suffer from many deficiencies including low product yield, inefficient use of available heat sources such as for example the discharge streams of compressors, many separate units being used to meet product specifications, high operating costs due to heating requirements, a large spatial footprint, and high capital cost.

In general, a GOSP is a continuous separation system and process that includes a high pressure production trap (HPPT), a low pressure production trap (LPPT), a low pressure degassing tank (LPDT), a dehydrator unit, first and second stage desalting units, a water/oil separation plant (WOSEP), a stabilizer column, atmospheric compressors, low pressure compressors, high pressure compressors, centrifugal pumps, heat exchangers, and reboilers. In a conventional GOSP, pressure is often reduced in several stages to allow for the controlled separation of volatile components. Objectives of a GOSP include achieving maximum liquid recovery of stabilized oil and water, and gas separation. However, a large pressure reduction in a single separator will cause flash vaporization, leading to instability and safety hazards. In the embodiments of the figures described here, other units not pictured such as those described supra can be applied, depending on the quality of inlet crude oil and other factors. For example, a stabilizer column and stripping gas can be applied for crude oil with high sulfur content.

Prior art GOSP systems and processes generally include 3 separate stages in large-footprint plants and processes. In a first stage, gas, crude oil, and free water are separated. In a second stage, crude oil is dehydrated and desalted to separate emulsified water and salt to meet certain basic sediment and water (BS&W) specifications. In a third stage, crude oil is stabilized and sweetened to meet hydrogen sulfide ($H_2S$) and Reid Vapor Pressure (RVP) specifications. Generally, sour crude oil refers to any crude oil with a total sulfur level of more than about 0.5% by weight. In upstream operations, as described herein, the phrase sour crude also refers to any crude oil with an $H_2S$ content higher than about 60 ppm by weight, and sweet crude oil refers to any crude oil that has an $H_2S$ content of less than about 60 ppm by weight.

After stabilization and sweetening, the crude oil should meet all specifications required for shipment, transport, and storage. These specifications include the following: (1) a salt concentration of not more than about 10 PTB; (2) BS&W of not more than about 0.3 V %; (3) $H_2S$ content of less than about 60 ppm in the crude stabilization tower (or degassing vessels in the case of sweet crude); and (4) a maximum RVP of about 7 psia and a maximum TVP of about 13.5 psia at 130° F. Importantly, embodiments shown in the present disclosure allow for the elimination of any HPPT preceding a LPPT.

In embodiments of the present disclosure, high pressure off-gases and high pressure compressed gases are in a pressure range from about 135 psig or about 170 psig to about 500 psig, low pressure off-gases and low pressure compressed gases are in a pressure range from about 35 psig or about 70 psig to about 180 psig, and atmospheric pressure off-gases and atmospheric pressure compressed gases are in a range from about 3 psig to about 80 psig. The temperature of the off-gases depends, in part, on the source of the crude oil. For example, the initial temperature for crude oil originating from offshore oil rigs ranges between about 55° F. to about 100° F., while the temperature of crude oil originating from onshore oil fields ranges from about 100° F. to about 150° F. For example, in one embodiment the temperature of high pressure off-gas from an HPPT is about 95° F., the temperature of low pressure off-gas from a LPPT is about 95° F. (with no heater preceding the LPPT), and the temperature of the atmospheric pressure off-gas from a LPDT is about 125° F., due to a heater (heat exchanger) preceding the LPDT. One or more HPPT, LPPT, and/or LPDT can precede the systems described here, and one or more stabilization tower can follow, with stripping gas applied as needed in any of the vessels described to reduce sulfur content.

Table 1 shows certain general temperature and pressure operating parameters in GOSP systems and methods. In known systems requiring a HPPT, a wet and unstabilized crude oil from oil production wells mixes with recycled effluent water from a LPPT in a mixing valve before entering a HPPT unit. The wet and unstabilized crude undergoes an initial three-phase separation and water dehydration in a HPPT using a plurality of insulated electrostatic electrodes to remove most of the gasses, along with free and emulsified water. Commercially-available insulated electrostatic electrodes enable operation at 100% water or 100% gas, and there is no requirement to operate at 25 psi above the crude vapor pressure, as is required in conventional desalters.

TABLE 1

Example Temperature and Pressure Operating Conditions for GOSPs.

| Vessels | Temperature, ° F. | Pressure, PSIG |
| --- | --- | --- |
| Inline Cyclonic Separator | 50-60 | 145-200 |
| HPPT | 80-100 | 135-165 |
| LPPT | 100-140 | 35-60 |
| LPDT | 100-150 | 3-15 |
| Dehydrator and/or Desalter | 120-180 | 90-200 |
| Stabilizer | 120-220 | 3-15 |
| Atmospheric Compressor Suction at Knockout Drum (KOD) | 100-150 | 3-15 |
| Atmospheric Compressor Discharge at KOD | 210-290 | 45-80 |
| Low Pressure Compressor Suction at KOD | 100-150 | 35-70 |
| Low Pressure Compressor Discharge at KOD | 210-290 | 145-180 |
| High Pressure Compressor Suction at KOD | 100-150 | 135-170 |
| High Pressure Compressor Discharge at KOD | 210-290 | 420-500 |

In some embodiments of the present disclosure, dehydrators and desalters are similar or the same types of vessels, and both functions of dehydrating and desalting can be performed in one unit or separate units in series. Dehydrators and desalters apply electrostatic coalescers to remove water, for example insulated electrostatic electrodes. During the initial dehydrating function, water salinity is greater than in the desalting function. During dehydration, the maximum amount of water possible is removed without focusing on the salt, while desalting is generally considered a finishing step to meet required water and salt specifications. For low water and low salinity crude oil, the dehydration and desalting functions can be performed in one vessel.

TABLE 2

Example Temperature Conditions for GOSP Heat Exchangers.

| Heat Exchanger | Wet crude Temperature, ° F. | |
|---|---|---|
| | Inlet | Outlet |
| 1$^{st}$ Heat Exchanger | 50-90 | 60-110 |
| 2$^{nd}$ Heat Exchanger | 60-110 | 120-130 |
| Trim Heater | 120-130 | 150-180 |

In some embodiments of the present disclosure, the operating temperatures of a HPPT and LPPT are substantially the same when no heater (heat exchanger) precedes the units. In some embodiments, the operating pressure of the HPPT is about 150 psig, the operating pressure of the LPPT is about 50 psig, and the operating pressure of the LPDT is about 3 psig. In some embodiments, no HPPT is required. In some embodiments, the operating temperatures of the HPPT and LPPT are about 95° F., while the operating temperature of the LPDT is about 125° F. In some embodiments, no HPPT is required.

A pressure drop in a HPPT causes lighter hydrocarbon gases in the crude oil to separate from the heavier liquid hydrocarbons. A plurality of electrostatic electrodes simultaneously dehydrates crude oil and removes a majority of emulsified water, for example up to about 98 volume %. The outputs from a HPPT are off-gas, which goes to the gas gathering system (HP Compressor), formation water, discharged for collection to a water/oil separation plant (WOSEP), and partially dried crude oil which goes to LPPT for further processing.

Partially dried crude oil coming from a HPPT unit is mixed with the recycled water from a LPDT through a mixing valve or any other high efficiency mixers and then passed to a 1$^{st}$ crude exchanger to reheat the oil/water/gas mixture. Heating the wet crude makes it easier to separate out gas and enhances the dehydrators/desalting efficiency.

Heated crude is then passed to the three-phase separator LPPT, where the operating pressure is lower than the HPPT, and the LPPT is also equipped with a plurality of electrostatic insulated electrodes to remove any remaining off-gas and emulsified water. The LPPT is a horizontal three-phase separation vessel. The operating pressure of the LPPT is lower than the HPPT to allow the removal of gas. In some embodiments, LPPT pressure is about ⅓ of the HPPT pressure to maximize liquid recovery. The outputs of the LPPT are off-gas which goes to the gas gathering system (LP Compressor), formation water recycled back to an HPPT upstream of the mixing valve (and/or to a WOSEP), and partially dried crude oil which goes to a LPDT for desalting and stabilization.

Dry crude oil from the LPPT unit still contains light components or impurities that need to be further reduced. These impurities can include $H_2S$, $N_2$, $CO_2$, $CH_4$, $C_2H_4$, $C_3H_6$, water, or any other suspended solids or light gases. The dry crude is mixed with fresh wash water in a mixing valve or any other mixers to disperse the water into small, fine droplets to reduce the salt content concentration or any other impurities. Low salinity wash water rinses the remaining salt from the crude oil. Fresh wash water is used in desalter processes and units to ensure that the maximum amount of salt is rinsed from the wet crude oil. Injecting the low salinity water before heat exchangers minimizes fouling.

Mixed crude with wash water is then heated in a second crude oil heat exchanger to increase the temperature to the optimum desalting/stabilizing temperature. Heating the wet crude makes it easier to separate out gas and enhance the desalting efficiency. Electrostatic coalescence removes the remaining water emulsion from the wet crude oil.

Heated crude then enters the LPDT vessel operating at a lower pressure than the LPPT to remove any remaining gas impurities from the crude and to meet the required RVP/$H_2S$ content. The operating pressure can range from as high as 10 psig to vacuum conditions in the LPDT.

One or more water/oil separator vessel collect water from streams from the dehydrators, LPDT, LPPT, and HPPT, and separate oil from the collected water. Wastewater can be discharged to disposal water wells and extracted oil can be conveyed to the LPDT.

Referring now to FIG. 1, a schematic diagram is presented showing an integrated GOSP of the present disclosure with optional real-time process control using a multivariable prediction controller (MPC) for controlling salt-in-crude content and water content of produced dry crude oil along with $H_2S$, RVP, and BS&W content, and applying recycle of compressed gases for indirect heating along with an inline cyclonic separator for sour crude oil. Importantly, in the embodiment of FIG. 1, no HPPT is shown or required. Direct injection and mixing of atmospheric compressor hot gas into the incoming crude oil to a LPPT directly and simultaneously heats the crude and cools the compressed gas. The compressed hot gas will work as a stripping gas in the LPPT and enables meeting $H_2S$ crude specifications, for example of about 10 ppmw using a crude oil stabilizer with 16 actual trays, along with optional steam injection and/or sweet stripping gas injection. Steam and/or sweet stripping gas can also be injected at a LPDT as needed (not pictured). Additional compressed gasses from one or more low pressure compressor and one or more high pressure compressor is used in one or more low pressure and one or more high pressure indirect gas/crude heat exchanger, respectively, to heat incoming crude oil, recover energy, and cool the compressed gasses. Also, the embodiment of FIG. 1 advantageously, surprisingly, and unexpectedly improves the treated crude oil yield at the expense of gas condensate production. The direct gas mixer in some embodiments includes one or more commercially-available mixing nozzle or device that can be manufactured in-house or can be purchased from specialized vendors like Prosep.

Embodiments similar to that of FIG. 1 can also include one or more inline gas-liquid separator, such as a compact inline cyclonic device that separates gas from a liquid stream, and such devices can be purchased from manufacturers such as Caltec, FMC, or ASCOM. One objective of such cyclonic separators is to separate gas at high pressure before the LPPT and at low temperature to conserve compression power consumption.

In embodiments similar to that of FIG. 1, the volume to volume for wash water at wash water injection points to oil is between about 1 to 9 volume % depending on the wash water salt content and the tightness of a crude oil-in-water emulsion. A lesser V/V wash water to oil ratio is used when the salt content of the wash water is less than 1000 ppmw. The higher the salt content, the higher the wash water to oil volume ration. For example, V/V for recycle water to oil is between about 5 to 9 volume %.

In the embodiment of FIG. 1, treated crude oil yield increases at the expense of low value gas condensate products. Heavy hydrocarbon, $C_{5+}$ products, remain with the treated crude oil product which increases the treated crude oil production and reduces the gas condensate production. This is shown in the following description and Tables for FIG. 1.

In some embodiments, an inline cyclonic gas separator operates at about 100 psi or greater, for example between about 50 psi and about 150 psi or greater, than a LPPT, and separated gas from the inline cyclonic gas separator is sent directly to a high pressure compressor, which leads to power conservation. In other words, an inline cyclonic gas separator can separate gases from incoming crude oil at a lesser temperature before heating and high pressure, which leads to lower compression power consumption. In some embodiments, produced gases are not sales gas, and require further processing in a gas plant. This is similar to produced gas condensates. Low pressure and high pressure discharge gases are used to heat the incoming oil crude to the LPPT in separate shell and tube heat exchangers.

In FIG. 1, GOSP system 100 includes an optional multi-variable prediction controller (MPC) 102 receiving and sending wired in addition to or alternative to wireless signals between certain units and measurement devices. In embodiments of the present disclosure, process control of a GOSP can be advantageously achieved with the addition of one or more unique basic sediment and water (BS&W) measurement devices or analyzers, for example placed to measure the BS&W content of a dry crude stream exiting a crude oil separation unit, such as a desalter, dehydrator, or stabilizer. This allows measurement of BS&W content in volume percent, which for a dry crude stream exiting a desalter largely provides a measurement in volume percent of water volume versus the total crude volume. The "sediment" volume portion of the measure is negligible in most processed crude oils. In addition, one or more total dissolved solids (TDS) analyzer is placed to measure or analyze the TDS of a stream comprising water exiting a desalter or dehydrator. TDS measurements can be made by conductivity meters on a water stream exiting a desalter, for example a first stage desalter or second stage desalter, and TDS can be provided in a measurement of mg/liter, discussed further with regard to FIG. 1.

From uniquely placed BS&W and TDS analyzers in a GOSP, for example proximate one or more desalter or dehydrator, salt-in-crude content in PTB can be continuously calculated, monitored, and analyzed in real-time, for example according to Equation 1:

$$PTB = \frac{0.35}{\eta_{mtx}} * \frac{BS\&W}{(100 - BS\&W)} * \left[1 + 0.695 * 10^{-6} * TDS\right] * TDS. \quad \text{(Eq. 1)}$$

In Equation 1, PTB is the PTB value in pounds of salt per one thousand barrels of a dry crude stream proceeding out from a desalter vessel or a dehydrator vessel; BS&W is the dry and processed crude basic sediment and water measurement in volume percent; TDS is an effluent water dissolved solids measurement in mg/L of the effluent water exiting from a desalter or a dehydrator; and $\eta_{mtx}$ the mixing efficiency to account for mixing inefficiencies due mixing valves, vessels, and the existence of solid salt crystals in crude oil. The PTB of the dry crude can be calculated as a function of the measurements of TDS and BS&W. In some embodiments, a typical value for $\eta_{mtx}$ is 1.0 for 100% mixing efficiency, where all salts are dissolved in water, and the effluent water is the same as the water droplets suspended within the crude. The $\eta_{mtx}$ value can be determined during the actual operation of the desalter or dehydrator to account for the actual mixing efficiency of the water droplets with salt and crude oil. For example, with a mix of 1, a TDS of 28000 mg/l, and BSW of 0.1, the PTB is 10.

Certain surprising and unexpected benefits of embodiments of the present disclosure include: (1) real-time online monitoring of and continuous control of dry crude salt-in-crude content; (2) meeting dry crude product specifications, for example maximum of about 10 PTB, without waiting for separate laboratory test results; (3) saved laboratory sampling time and cost; (4) minimization of use of desalter wash water; (5) minimization of chemical demulsifier injection; (6) minimization in energy consumption of process pumps including wash water pumps (via minimization of wash water flow requirements), crude charge pumps (via optimization of mixing valve differential pressure), desalter wash water recycle pumps (via minimization of recycle wash water flow requirements), dehydrator recycle pumps (via minimization of dehydrator recycle flow requirements); (7) minimization of dehydrator power consumption; (8) minimization of desalter power consumption; (9) reduced man-hours spent physically collecting and analyzing crude samples and other samples from a GOSP; and (10) reduced corrosion rates to process equipment such as desalters and catalysts via control of salt-in-crude content.

Figure 2:
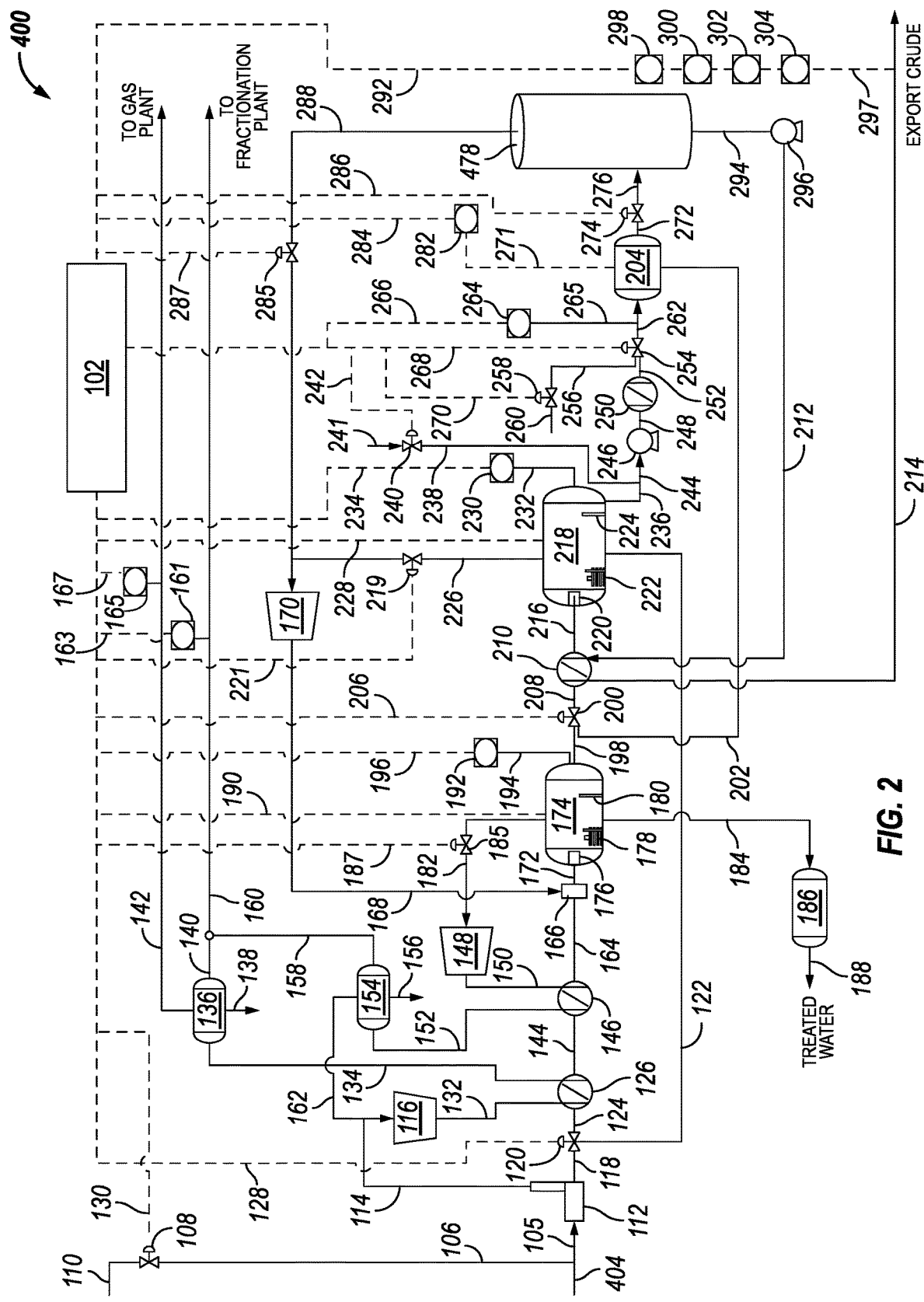
FIG. 2 is a schematic diagram showing an integrated GOSP of the present disclosure with optional real-time process control using a MPC for controlling salt-in-crude content and water content of produced dry crude oil along with $H_2S$, RVP, and BS&W content, and applying recycle of compressed gases for indirect heating along with an inline cyclonic separator for sweet crude oil.
Figure 3:
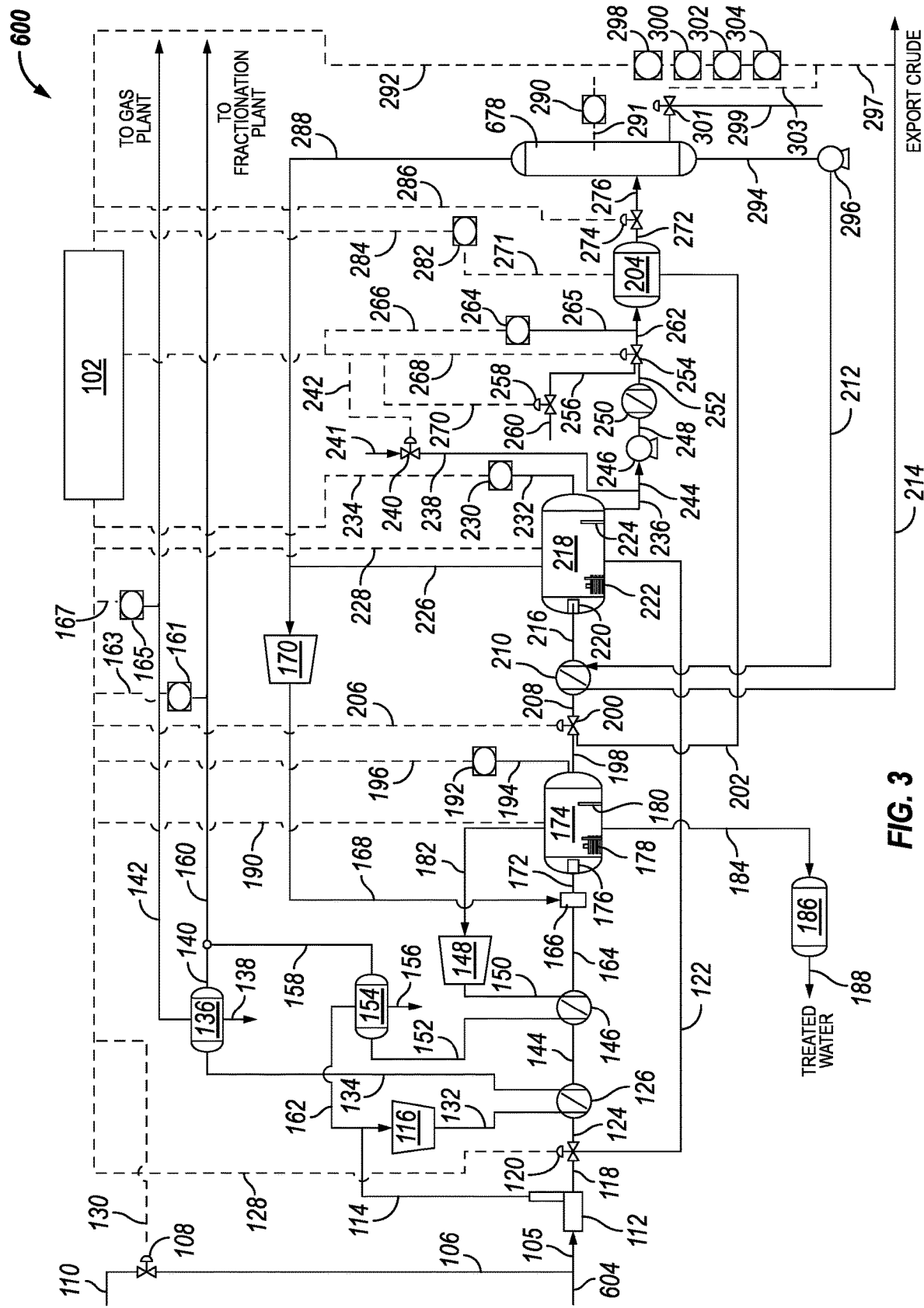
FIG. 3 is a schematic diagram showing an integrated GOSP of the present disclosure with optional real-time process control using a MPC for controlling salt-in-crude content and water content of produced dry crude oil along with $H_2S$, RVP, and BS&W content, and applying recycle of compressed gases for indirect heating along with an inline cyclonic separator for sweet crude oil.

In other embodiments, however, in FIGS. 1 to 3, a MPC is not required, and the systems can be monitored and controlled manually. For MPC control in the embodiment of FIG. 1, a closed loop controller is configured in a distributed control system or DCS where the process variables are: the salt content in PTB where the maximum value is 10 PTB; basic sediment and water (BS&W) where the maximum value is 0.2 volume %; Reid Vapor Pressure (RVP) where the maximum value is 8 psia; and $H_2S$ content in ppmw, where the maximum value is 70 ppmw of $H_2S$.

Manipulated variables in the embodiment of FIG. 1 via the MPC to meet the above specifications include: demulsifier injection rate, wash water application rate and salinity, desalter voltage and current, mixing valve pressure drop, unit interface levels, trim heater temperature, stabilizer reboiler temperature, and stripping gas injection rate, if required. The MPC (or MVC for multi-variable controller) can be used to control the plant specifications below the maximum allowable limits discussed above.

In FIG. 1, GOSP system 100 with optional MPC 102 accepts a sour crude oil inlet stream 104 and stream 104 is optionally mixed with demulsifier from demulsifier stream 106, control valve 108, and demulsifier inlet stream 110. Control valve 108 is in communication via signal 130 with MPC 102. In embodiments described herein, signals can be wired in addition to or alternative to wireless, and can provide information one way to MPC's or two ways between an MPC and a control unit or measurement unit. For example, in the embodiment of FIG. 1, additional demulsifier could be added depending on the tightness of the water-in-crude emulsion in stream 104, which can be signaled by an increased or off-spec reading at BS&W meter 298 in communication with MPC 102 by signal 292. Stream 105 including crude oil and optional demulsifier enters inline cyclonic separator 112, which in some embodiments operates at a pressure between about 50 psi and about 150 psi greater than LPPT 174. Inline cyclonic separator 112 separates gases such as natural gas and other light components from the crude oil which proceed out of inline cyclonic separator 112 via stream 114 to high pressure compressor 116.

Partially de-gassed crude oil proceeds from inline cyclonic separator 112 via stream 118 to mixing valve 120, where the partially de-gassed crude oil is mixed with recycle water from stream 122 and LPDT 218. Signal 128, in communication between MPC 102 and mixing valve 120, allows for control of the addition of recycle water via stream 122 from LPDT 218. For example, for higher salinity crude oil, additional recycle water could be added via mixing valve 120. The partially de-gassed crude oil with optional demulsifier and recycle water then proceeds via stream 124 to indirect heat exchanger 126 where it is heated via compressed gas from stream 132 and high pressure compressor 116. High pressure compressed gas is cooled in indirect heat exchanger 126 and proceeds via stream 134 to high pressure KOD 136. High pressure KOD 136 separates the components of stream 134 into natural gas stream 142 which proceeds to a natural gas plant for further treatment, a natural gas condensates stream 140 which proceeds via stream 160 to a condensate fractionation plant for further treatment, and water which is removed via stream 138, optionally for treatment in a WOSEP. Indirect heat exchanger 126 can include any one of or any combination of indirect heat exchangers such as shell and tube heat exchangers, where the high pressure compressed gas proceeds through the tubes, and the crude oil for heating, optionally with demulsifier and recycle water, proceeds through the shell.

Initially-heated, partially-degassed crude oil, with optional demulsifier and an optional mount of recycle water, proceeds via stream 144 to a second indirect heat exchanger 146 for further heating. Indirect heat exchanger 146 can include any one of or any combination of indirect heat exchangers such as shell and tube heat exchangers, where low pressure compressed gas proceeds through the tubes, and the crude oil for heating, optionally with demulsifier and recycle water, proceeds through the shell. Low pressure compressed gas enters indirect heat exchanger 146 from stream 150, low pressure compressor 148, and low pressure off-gas stream 182 from LPPT 174. Low pressure compressed gas is cooled in indirect heat exchanger 146 and proceeds via stream 152 to low pressure KOD 154. Low pressure KOD 154 separates the components of stream 152 into off-gas stream 162 which proceeds to high pressure compressor 116 for compression and mixing with off-gas from stream 114, a natural gas condensates stream 158 which proceeds via stream 160 to a condensate fractionation plant for further treatment, and water which is removed via stream 156, optionally for treatment in a WOSEP.

Partially de-gassed, heated crude oil, with optional demulsifier in addition to or alternative to recycle water, proceeds via stream 164 to inline direct mixer device 166, which can include any one of or any combination of one or more mixing valve, nozzle, or mixing tank. Inline direct mixer device 166 directly mixes into the partially de-gassed, heated crude oil, with optional demulsifier in addition to or alternative to recycle water, atmospheric pressure compressed gas from steam 168 and atmospheric pressure compressor 170, including atmospheric off-gases from stream 226 from LPDT 218 and stream 288 from stabilizer 278. The atmospheric pressure compressed gas from stream 168 mixed with the crude oil in inline direct mixer device 166 acts as a stripping gas for $H_2S$ in LPPT 174 once the oil and gas mixture proceeds to LPPT 174 by stream 172.

LPPT 174 includes a cyclonic separator 176 for gas-oil separation at the inlet, insulated electrostatic electrodes 178 for oil-in-water emulsion separation, and a weir 180. As shown, LPPT 174 is in communication with MPC 102 via signal 190 and can provide information to MPC 102 including, but not limited to, temperature, pressure, and/or residence time, along with current and/or voltage of insulated electrostatic electrodes 178. Level indicator and controller (LIC) 192 is in communication with MPC 102 via signal 196 and LPPT 174 via signal 194 to control the level of water and oil-in-water emulsion in LPPT 174, for example by water release via stream 184 to WOSEP 186 and treated water outlet 188. LIC 192 can control in some embodiments the level of an oil-in-water emulsion to be proximate the top of weir 180 while water is drained via stream 184 to WOSEP 186. Importantly, in the embodiments of FIGS. 1-3 the unique arrangement of the inline cyclonic separator, the first and second indirect heat exchangers, and the inline direct mixer allow crude oil to enter the LPPT for treatment without the use of a HPPT. Low pressure off-gas from LPPT 174 proceeds via stream 182 to low pressure compressor 148 for compression.

Partially-treated crude oil exits LPPT 174 and proceeds via stream 198 to mixing valve 200 where it is mixed with an optional amount of recycle water from stream 202 and desalter 204. Mixing valve 200 is in communication with MPC 102 via signal 206, and MPC 102 can optionally control the amount of recycle water added at mixing valve 200 along with the pressure drop across mixing valve 200. Partially-treated crude oil with an optional amount of recycle water from desalter 204 proceeds via stream 208 to an indirect wet-dry oil heat exchanger 210, in which heated and finally treated oil from stream 212, crude shipping pump 296, stream 294, and stabilizer 278 heats the wet crude oil, and cooled, treated crude oil for export proceeds out of the system via stream 214. In some embodiments, indirect wet-dry oil heat exchanger 210 can include any one of or any combination of indirect heat exchangers, such as shell and tube heat exchangers with the hot, finally treated crude oil proceeding through the tubes and the wet crude oil for further treatment proceeding through the shell.

Heated, wet partially dried and de-gassed crude oil proceeds via stream 216 to LPDT 218, which itself includes cyclonic separator 220, insulated electrostatic electrodes 222, and a weir 224. LPDT 218 is in communication with MPC 102 via signal 228 and can provide information to MPC 102 including, but not limited to, temperature, pressure, and/or residence time, along with current and/or voltage of insulated electrostatic electrodes 222. Level indicator and controller (LIC) 230 is in communication with MPC 102 via signal 234 and LPDT 218 via signal 232 to control the level of water and oil-in-water emulsion in LPDT 218, for example by water release via stream 122 for recycle to mixing valve 120, or in other embodiments (not pictured here) to a WOSEP. LIC 230 can control in some embodiments the level of an oil-in-water emulsion to be proximate the top of weir 224 while water is drained via stream 122. Atmospheric pressure off-gas from LPDT 218 proceeds via stream 226 to atmospheric pressure compressor 170 for compression. LPPT 174 operates in effect as a knockout drum for gas from stream 168 once mixed via inline direct mixer device 166 into stream 172. No atmospheric compressor after cooler is required. In other embodiments not pictured here, where a HPPT is applied preceding a LPPT, the HPPT can function as low pressure compressor discharge KOD, and in embodiments described here, low pressure compressor aftercoolers are not required. Low pressure hydrocarbon condensate pumps are also not required.

Degassed and dried crude oil proceeds out of LPDT 218 via stream 236 where it is optionally mixed with additional demulsifier from second demulsifier stream 238 provided by control valve 240 and second demulsifier inlet stream 241. Control valve 240 is in communication in the embodiment shown with MPC 102 via signal 242 to provide additional demulsifier as needed to reach required BS&W, RVP, $H_2S$, and PTB specifications of the system, measured at stream 214 in the embodiment shown. Degassed and dried crude oil optionally with additional demulsifier proceeds via stream 244 to crude charge pump 246, stream 248, a trim heater 250 for additional heating if necessary, stream 252, and a mixing valve 254. At mixing valve 254, fresh water can be added to the degassed and dried crude oil for desalting prior to entry into desalter 204. Fresh water is added to mixing valve 254 by stream 256, control valve 258, and fresh water inlet stream 260. Control valve 258 is in communication with MPC 102 by way of signal 270 and mixing valve 254 is in communication with MPC 102 by way of signal 268, and MPC 102 can add fresh water as needed to reach required BS&W, RVP, $H_2S$, and PTB specifications of the system, measured at stream 214 in the embodiment shown. In addition, a temperature controller (TC) 264 is in communication with MPC 102 via signal 266 and is in communication with stream 262 via signal 265 to control the temperature of the crude oil prior to entry into desalter 204, for example by manipulating heat applied at trim heater 250 and controlling the amount of fresh water applied at mixing valve 254.

Degassed and dried crude oil now optionally mixed with demulsifier and/or fresh water proceeds via stream 262 to desalter 204 for desalting, for example to meet PTB system specifications. LIC 282 is in communication with MPC 102 by way of signal 284 and desalter 204 by way of signal 271 to control the level within desalter 204. In some embodiments, LIC 282 can include a temperature indicator and control for desalter 204 based on stream 272. Desalter 204 can have its internal level lowered either or both by increasing flow to streams 272 or 202. Degassed, dried, and desalted crude oil next proceeds via stream 272 to control valve 274, which is in communication with MPC 102 by way of signal 286 to control the flow rate to stabilizer 278 by way of stream 276. Stabilizer 278 includes stabilizer reboilers 280, treated crude oil outlet stream 294, and atmospheric off-gas stream 288. A temperature controller 290 is in communication with MPC 102 by way of signal 292 and is in communication with stabilizer 278 by signal 291. Temperature controller 290 can control the stabilizer 278, generally only necessary in the case of sour crude oil, to meet required specifications for $H_2S$.

BS&W meter 298, RVP meter 300, $H_2S$ meter 302, and PTB meter 304 are in communication with stream 214 via signal 297 and are in communication with MPC 102 via signal 292 to control parameters throughout GOSP system 100 via controllable variables such as, but not limited to, demulsifier injection rate, fresh water and recycle water injection rate, insulated electrostatic electrode current and voltage, mixing valve operation and pressure drop, stabilizer and reboiler temperature, and unit levels for water and emulsions.

To implement systems, processes, and methods of the present disclosure, one or more TDS conductivity meter can be installed and calibrated on a water outlet stream exiting from a desalter or dehydrator, for example a $1^{st}$ stage and/or $2^{nd}$ stage desalter, and one or more BS&W analyzer can be installed and calibrated on a dry crude oil stream exiting from a desalter or dehydrator, for example a $1^{st}$ stage and/or $2^{nd}$ stage desalter. PTB measurements can calculated in a controller and/or distributed control system (DCS) based on real-time, online TDS and BS&W measurements, where set process variables can include any one of or any combination of PTB, TDS, and BS&W, and manipulated process variables include any one of or any combination of chemical demulsifier injection rate, wash water (fresh or recycle) injection rate, power consumption, water level in a crude oil separation vessel, oil-water emulsion level in a crude oil separation vessel, and pressure drop across valves for mixing.

A distributed control system (DCS) includes a computerized control system for a process or plant, optionally with more than one control loop, in which autonomous controllers are distributed throughout the system, but there is no central operator supervisory control required. Non-DCS systems include centralized controllers; either discrete controllers located at a central control room or within a central computer. DCS systems increase reliability and reduce installation costs by localizing control functions near a process or system, with remote monitoring and supervision.

Prior art oil refineries and GOSP's have not used PTB as a control variable based on readings from BS&W and TDS conductivity meters to control process units, such as desalters and dehydrators, to advantageously automate and optimize oil refinery and GOSP systems and processes. By calculating, controlling, and monitoring PTB in real-time via BS&W and TDS measurements, desalter and overall systems are optimized, and controlling salt-in-crude content via the disclosed embodiments enables the process of multivariable process control (MPC) for proper handling of wet, unprocessed crude oils. Process dependency on expensive, unreliable oil-water interface level measurements can be eliminated. Inexpensive, commercially-available BS&W and TDS measurement devices/analyzers can be placed to control PTB as a variable in real-time while avoiding separate, time-consuming laboratory analysis and avoiding expensive, unreliable, and labor-intensive analyzers.

FIG. 1 Example

A simulation was run for the embodiment of FIG. 1 including a closed loop controller in a DCS, where the set process specifications included: maximum PTB of 10; maximum BS&W content of 0.2 volume %; maximum RVP of 8 psia; and maximum $H_2S$ content of 70 ppmw. Controllable variables include, but are not limited to, demulsifier injection rate, wash water injection rate (fresh and/or recycle), trim heater temperature, and stabilizer reboiler temperature. The simulation compared the embodiment of FIG. 1 with the unique and particular configuration of the atmospheric pressure compressor 170, the low pressure compressor 148, the high pressure compressor 116, the low pressure knockout drum 154, the high pressure knockout drum 136, the inline cyclonic separator 112, the first indirect heat exchanger 126, the second indirect heat exchanger 146, and the inline direct mixer device 166 to a prior art system.

The prior art system included an LPPT and LPDT without electrostatic coalescers, leading to inefficient separations; one dehydrator and two separate desalters leading to additional required equipment and cost; wasted compressor heat; higher heat consumption; and no inferential sensors to measure crude specifications and control the system and heat usage.

TABLE 3

Certain Operating Temperatures for the System of FIG. 1 ("After Modification") Versus a Prior Art System ("Before Modification").

| Operating Temperature | Before modification | After modification |
|---|---|---|
| Inline Cyclonic Separator 112 Temp., ° F. | — | 54 |
| LPPT/dehydrator 174 Operating Temp., ° F. | 3 | 3 |
| LPDT/dehydrator 218 Operating Temp., ° F. | 95 | 124 |
| Dehydrator operating Temp., ° F. | 162 | n/a |
| Desalter 204 Operating Temp., ° F. | 162 | 162 |
| Stabilizer Reboilers 280 Temp., ° F. | 202 | 157 |
| Atm Comp. 170 Suction Temp., ° F. | 116 | 130 |
| Atm Comp. 170 Discharge Temp., ° F. | 241 | 252 |
| LP Comp. 148 Suction Temp., ° F. | 81 | 117 |
| LP Comp 148 Discharge Temp., ° F. | 204 | 226 |
| HP Comp. 116 Suction Temp., ° F. | 119 | 90 |
| HP Comp. Discharge Temp., ° F. | 242 | 217 |

Table 3 shows for embodiments of the present disclosure (after modification) the LPPT 174 and LPDT 218 with insulated electrostatic electrodes 178 and 222, respectively, provide dual functionality. LPPT 174 and LPDT 218 act as both three phase separators and as dehydrators. Before modifications, the LPPT and LPDT only function as three-phase separators to separate gas and water from oil by settling. Crude dehydration functionality is surprisingly and unexpectedly increased after modifications using electrostatic coalescers, and separate dehydrator units can be eliminated.

In the embodiment of FIG. 1, treated crude oil yield is improved by 3.22 MBD (thousand barrels per day) at the expense of lost gas condensate products of 2.38 MBD. Heating demand is reduced by 96 MMbtu/hr, or by about 45.3%. Compressor power consumption is reduced in the embodiment of FIG. 1 by 2,003 horsepower, or about 8.1%.

TABLE 4

Certain Improvements for the System of FIG. 1 ("After Modification") Versus a Prior Art System ("Before Modification").

| Yields | Before Modification | After Modification | Change | Benefits |
|---|---|---|---|---|
| Gas, MMSCFD | 74.8 | 71.9 | −2.9 | Gas decrease |
| Condensate, MBD | 39.65 | 37.27 | −2.38 | Condensate decrease (lesser value product) |
| Export Crude, MBD | 298.95 | 302.15 | 3.20 | Crude increase (greater value product) |

TABLE 5

Certain Improvements in Heating Demand for the System of FIG. 1 ("After Modification") Versus a Prior Art System ("Before Modification").

| Heating Energy Consumption | Before Modification | After Modification | Change | % Savings |
|---|---|---|---|---|
| Trim Heater 250 Duty, MMBtu/hr | 125.8 | 48.5 | −77.3 | 61.4% |
| Stabilizer Reboilers 280 Duty, MMBtu/hr | 87.0 | 68.0 | −19.0 | 21.8% |
| Total Heating/Cooling, MMBtu/hr | 212.8 | 116.5 | −96 | 45.3% |

TABLE 6

Certain Improvements in Compressor Power Consumption for the System of FIG. 1 ("After Modification") Versus a Prior Art System ("Before Modification").

| Compression Power Consumption, hp | Before Modification | After Modification | Change | % Saving |
|---|---|---|---|---|
| ATM Compressor 170 motor power consumption, hp | 5,576 | 8,748 | 3,172.5 | −56.9% |
| LP Compressor 148 motor power consumption, hp | 10,023 | 6,140 | −3,882.7 | 38.7% |
| HP Compressor 116 motor power consumption, hp | 9,162 | 7,869 | −1,292.9 | 14.1% |
| Total compression power, hp | 24,761 | 22,758 | −2,003 | 8.1% |

TABLE 7

Additional Surprising and Unexpected Improvements in the System of FIG. 1 ("After Modification") Versus a Prior Art System ("Before Modification").

| Product Quality Improvement | Before Modification | After Modification | Change | Benefits |
|---|---|---|---|---|
| Moisture Content of Produced Gas in Stream 142 to Gas Dehydration Plant, lb/MMSCF | 190.36 | 70.66 | −62.9% | Reduce design and operation cost of gas dehydration system |

TABLE 7-continued

Additional Surprising and Unexpected Improvements in the System of FIG. 1 ("After Modification") Versus a Prior Art System ("Before Modification").

| Product Quality Improvement | Before Modification | After Modification | Change | Benefits |
|---|---|---|---|---|
| Produced Condensate and Water Content, ppmw | 483.2 | 323.9 | −33.0% | Reduce corrosion in pipeline by reducing moisture content |
| Export Crude at Stream 214, H$_2$S Content, ppmw | 10.04 | 9.99 | −0.4% | In spec |
| Export Crude at Stream 214, API | 29.10 | 29.60 | 1.7% | Improve the API quality by 2% leading to higher return |
| TVP at 140° F. at Stream 214, psia (Limit is 13 psia) | 8 | 9 | | Below 13.0 psia |

Referring to the embodiment of FIG. 1, an online condensate moisture analyzer 161 is shown to detect and measure moisture content in stream 160 and is in communication with MPC 102 via signal 163. An online gas moisture analyzer 165 is shown to detect and measure moisture content in stream 142 and is in communication with MPC 102 via signal 167. Online moisture content analyzers are provided in the shipping condensate line to the fractionation plant and on the gas line to the gas plant and are used to measure and monitor the water content in condensate in ppmw. As shown in Table 7, the moisture analyzers show the embodiments of the present disclosure allow for reduced design and operation cost of gas dehydration systems and reduced corrosion in pipelines by reducing moisture content.

Referring now to FIG. 2, a schematic diagram is presented showing an integrated GOSP of the present disclosure with optional real-time process control using a multivariable prediction controller (MPC) for controlling salt-in-crude content and water content of produced dry crude oil along with H$_2$S, RVP, and BS&W content, and applying recycle of compressed gases for indirect heating along with an inline cyclonic separator for sweet crude oil. Similarly labeled components to those of FIG. 1 are similar to those described for FIG. 1. In GOSP system 400 of FIG. 2, incoming sweet crude oil in stream 404 can be treated without a stabilizer and reboilers as shown in FIG. 1. For example, in FIG. 2 dried, de-watered, de-salted treated crude oil proceeds via stream 276 to export product tank 478 without any necessary stabilization.

Additionally, FIG. 2 shows control valves 185, 219, and 285 in fluid communication with low pressure off-gas stream 182, atmospheric pressure off-gas stream 226, and atmospheric off-gas stream 288, respectively, to control the recycle flow rates of the off-gas streams to low pressure compressor 148 and atmospheric pressure compressor 170. Control valve 185 is in communication with MPC 102 via signal 187, control valve 219 is in communication with MPC 102 via signal 221, and control valve 285 is in communication with MPC 102 via signal 287. While the embodiment of FIG. 2 shows the use of an MPC, in other embodiments no MPC is required, and the system can be operated and adjusted manually according to the desired specifications of BS&W, RVP, H$_2$S and PTB.

FIG. 2 Example

A simulation was run for the embodiment of FIG. 2 including a closed loop controller in a DCS, where the set process specifications included: maximum PTB of 10; maximum BS&W content of 0.2 volume %; maximum RVP of 8 psia; and maximum H$_2$S content of 70 ppmw. Controllable variables include, but are not limited to, demulsifier injection rate, wash water injection rate (fresh and/or recycle), trim heater temperature, and stabilizer reboiler temperature. The simulation compared the embodiment of FIG. 2 with the unique and particular configuration of the atmospheric pressure compressor 170, the low pressure compressor 148, the high pressure compressor 116, the low pressure knockout drum 154, the high pressure knockout drum 136, the inline cyclonic separator 112, the first indirect heat exchanger 126, the second indirect heat exchanger 146, and the inline direct mixer device 166 to a prior art system.

The prior art system included an LPPT and LPDT without electrostatic coalescers, leading to inefficient separations; one dehydrator and two separate desalters leading to additional required equipment and cost; wasted compressor heat; higher heat consumption; and no inferential sensors to measure crude specifications and control the system and heat usage.

TABLE 8

Certain Operating Temperatures for the System of FIG. 2 ("After Modification") Versus a Prior Art System ("Before Modification").

| Operating Temperature | Before modification | After modification |
|---|---|---|
| Inline Cyclonic Separator 112 Temp., ° F. | — | 54 |
| LPPT/dehydrator 174 Operating Temp., ° F. | 3 | 3 |
| LPDT/dehydrator 218 Operating Temp., ° F. | 95 | 124 |
| Dehydrator operating Temp., ° F. | 162 | n/a |
| Desalter 204 Operating Temp., ° F. | 162 | 162 |
| Stabilizer Reboilers 280 Temp., ° F. | 202 | 157 |
| Atm Comp. 170 Suction Temp., ° F. | 116 | 130 |
| Atm Comp. 170 Discharge Temp., ° F. | 241 | 252 |
| LP Comp. 148 Suction Temp., ° F. | 81 | 117 |
| LP Comp 148 Discharge Temp., ° F. | 204 | 226 |
| HP Comp. 116 Suction Temp., ° F. | 119 | 90 |
| HP Comp. Discharge Temp., ° F. | 242 | 217 |

Table 8 shows for embodiments of the present disclosure (after modification) the LPPT 174 and LPDT 218 with insulated electrostatic electrodes 178 and 222, respectively, provide dual functionality. LPPT 174 and LPDT 218 act as both three phase separators and as dehydrators. Before modifications, the LPPT and LPDT only function as three-phase separators to separate gas and water from oil by settling. Crude dehydration functionality is surprisingly and unexpectedly increased after modifications using electrostatic coalescers, and separate dehydrator units can be eliminated. While stabilizer reboilers 280 are shown in the example of Table 8, these are optional based on the type of crude oil and whether stabilization is required or not prior to storage.

In the embodiment of FIG. 2, treated crude oil yield is improved by 3.0 MBD at the expense of lost gas condensate products of 1.9 MBD. Heating demand is reduced by 143 MMbtu/hr, or by about 67.200. Compressor power consumption is reduced in the embodiment of FIG. 2 by 1333 horsepower, or about 5.4%.

TABLE 9

Certain Improvements for the System of FIG. 2 ("After Modification") Versus a Prior Art System ("Before Modification").

| Yields | Before Modification | After Modification | Change | Benefits |
|---|---|---|---|---|
| Gas, MMSCFD | 74.8 | 72.3 | −2.6 | Gas decrease |
| Condensate, MBD | 39.7 | 37.8 | −1.9 | Condensate decrease (lesser value product) |

TABLE 9-continued

Certain Improvements for the System of FIG. 2 ("After Modification") Versus a Prior Art System ("Before Modification").

| Yields | Before Modification | After Modification | Change | Benefits |
|---|---|---|---|---|
| Export Crude, MBD | 299.0 | 301.9 | 3.0 | Crude increase (greater value product) |

TABLE 10

Certain Improvements in Heating Demand for the System of FIG. 2 ("After Modification") Versus a Prior Art System ("Before Modification").

| Heating Energy Consumption | Before Modification | After Modification | Change | % Savings |
|---|---|---|---|---|
| Trim Heater 250 Duty, MMBtu/hr | 125.8 | 69.9 | −55.9 | 44.5% |
| Stabilizer Reboilers 280 Duty, MMBtu/hr | 87.0 | 0.0 | −87.0 | 100.0% |
| Total Heating/Cooling, MMBtu/hr | 212.8 | 69.9 | −143 | 67.2% |

TABLE 11

Certain Improvements in Compressor Power Consumption for the System of FIG. 2 ("After Modification") Versus a Prior Art System ("Before Modification").

| Compression Power Consumption, hp | Before Modification | After Modification | Change | % Saving |
|---|---|---|---|---|
| ATM Compressor 170 motor power consumption, hp | 5,576 | 9,330 | 3,753.7 | −67.3% |
| LP Compressor 148 motor power consumption, hp | 10,023 | 6,156 | −3,867.6 | 38.6% |
| HP Compressor 116 motor power consumption, hp | 9,162 | 7,943 | −1,219.0 | 13.3% |
| Total compression power, hp | 24,761 | 23,428 | −1,333 | 5.4% |

TABLE 12

Additional Surprising and Unexpected Improvements in the System of FIG. 2 ("After Modification") Versus a Prior Art System ("Before Modification").

| Product Quality Improvement | Before Modification | After Modification | Change | Benefits |
|---|---|---|---|---|
| Moisture Content of Produced Gas in Stream 142 to Gas Dehydration Plant, lb/MMSCF | 190.36 | 70.60 | −62.9% | Reduce design and operation cost of gas dehydration system |
| Produced Condensate and Water Content, ppmw | 483.2 | 322.4 | −33.3% | Reduce corrosion in pipeline by reducing moisture content |
| Export Crude at Stream 214, $H_2S$ Content, ppmw | 10.04 | 10.14 | 1.1% | In spec |
| Export Crude at Stream 214, API | 29.10 | 29.55 | 1.6% | Improve the API quality by 2% leading to higher return |
| TVP at 140° F. at Stream 214, psia (Limit is 13 psia) | 8 | 13 | | Below 13.0 psia |

Referring to the embodiment of FIG. 2, an online condensate moisture analyzer 161 is shown to detect and measure moisture content in stream 160 and is in communication with MPC 102 via signal 163. An online gas moisture analyzer 165 is shown to detect and measure moisture content in stream 142 and is in communication with MPC 102 via signal 167. Online moisture content analyzers are provided in the shipping condensate line to the fractionation plant and on the gas line to the gas plant and are used to measure and monitor the water content in condensate in ppmw. As shown in Table 12, the moisture analyzers show the embodiments of the present disclosure allow for reduced design and operation cost of gas dehydration systems and reduced corrosion in pipelines by reducing moisture content.

Referring now to FIG. 3, a schematic diagram is presented showing an integrated GOSP of the present disclosure with optional real-time process control using a multivariable prediction controller (MPC) for controlling salt-in-crude content and water content of produced dry crude oil along with $H_2S$, RVP, and BS&W content, and applying recycle of compressed gases for indirect heating along with an inline cyclonic separator for sweet crude oil. Similarly labeled components to those of FIG. 1 and FIG. 2 are similar to those described for FIG. 1 and FIG. 2. In GOSP system 600 of FIG. 3, incoming sweet crude oil in stream 604 can be treated without reboilers, as shown in FIG. 1, instead in a cold stabilizer 678. For example, in FIG. 3 dried, dewatered, de-salted treated crude oil proceeds via stream 276 to cold stabilizer 678. Cold stabilizer 678 includes a sweet stripping gas inlet stream 299 controlled by control valve 301, which itself is in communication with MPC 102 by signals 303, 297, and 292. Sweet stripping gas can be optionally added to the system as needed, for example to meet $H_2S$ specifications. While the embodiment of FIG. 3 shows the use of an MPC, in other embodiments no MPC is required, and the system can be operated and adjusted manually according to the desired specifications of BS&W, RVP, $H_2S$ and PTB.

FIG. 3 Example

A simulation was run for the embodiment of FIG. 3 including a closed loop controller in a DCS, where the set process specifications included: maximum PTB of 10; maximum BS&W content of 0.2 volume %; maximum RVP of 8 psia; and maximum $H_2S$ content of 70 ppmw. Controllable variables include, but are not limited to, demulsifier injection rate, wash water injection rate (fresh and/or recycle), trim heater temperature, and stabilizer reboiler temperature. The simulation compared the embodiment of FIG. 3 with the unique and particular configuration of the atmospheric pressure compressor 170, the low pressure compressor 148, the high pressure compressor 116, the low pressure knockout drum 154, the high pressure knockout drum 136, the inline cyclonic separator 112, the first indirect heat exchanger 126, the second indirect heat exchanger 146, and the inline direct mixer device 166 to a prior art system.

The prior art system included an LPPT and LPDT without electrostatic coalescers, leading to inefficient separations; one dehydrator and two separate desalters leading to additional required equipment and cost; wasted compressor heat; higher heat consumption; and no inferential sensors to measure crude specifications and control the system and heat usage.

TABLE 13

Certain Operating Temperatures for the System of FIG. 3 ("After Modification") Versus a Prior Art System ("Before Modification").

| Operating Temperature | Before modification | After modification |
|---|---|---|
| Inline Cyclonic Separator 112 Temp., ° F. | — | 54 |
| LPPT/dehydrator 174 Operating Temp., ° F. | 54 | 116 |
| LPDT/dehydrator 218 Operating Temp., ° F. | 94 | 121 |
| Desalter 204 Operating Temp., ° F. | 162 | 162 |
| Cold Stabilizer 678 Temp., ° F. | 202 | 160 |
| Atm Comp. 170 Suction Temp., ° F. | 120 | 120 |
| Atm Comp. 170 Discharge Temp., ° F. | 241 | 249 |
| LP Comp. 148 Suction Temp., ° F. | 81 | 114 |
| LP Comp 148 Discharge Temp., ° F. | 204 | 224 |
| HP Comp. 116 Suction Temp., ° F. | 119 | 89 |
| HP Comp. Discharge Temp., ° F. | 242 | 217 |

Table 13 shows for embodiments of the present disclosure (after modification) the LPPT 174 and LPDT 218 with insulated electrostatic electrodes 178 and 222, respectively, provide dual functionality. LPPT 174 and LPDT 218 act as both three phase separators and as dehydrators. Before modifications, the LPPT and LPDT only function as three-phase separators to separate gas and water from oil by settling. Crude dehydration functionality is surprisingly and unexpectedly increased after modifications using electrostatic coalescers, and separate dehydrator units can be eliminated.

In the embodiment of FIG. 3, treated crude oil yield is improved by 4.5 MBD at the expense of lost gas condensate products of 4.5 MBD, as a result of using 3.5 MMSCFD of sweet stripping gas. Heating demand is reduced by 156 MMbtu/hr, or by about 65.1%. Compressor power consumption is reduced in the embodiment of FIG. 3 by 2009 horsepower, or about 8.1%. Sweet stripping gas, in some embodiments, can include methane and ethane, for example a stripping gas comprising about 98 wt. % methane and about 2 wt. % ethane. Other stripping gases known in the art such as nitrogen can also be applied.

TABLE 14

Certain Improvements for the System of FIG. 3 ("After Modification") Versus a Prior Art System ("Before Modification").

| Yields | Before Modification | After Modification | Change | Benefits |
|---|---|---|---|---|
| Gas, MMSCFD | 74.8 | 73.7 | −1.2 | Gas decrease |
| Condensate, MBD | 39.7 | 35.2 | −4.5 | Condensate decrease (lesser value product) |
| Export Crude, MBD | 299.0 | 303.4 | 4.5 | Crude increase (greater value product) |

TABLE 15

Certain Improvements in Heating Demand for the System of
FIG. 3 ("After Modification") Versus a Prior Art
System ("Before Modification").

| Heating Energy Consumption | Before Modification | After Modification | Change | % Savings |
|---|---|---|---|---|
| Trim Heater 250 Duty, MMBtu/hr | 125.8 | 69.9 | −51.5 | 40.9% |
| Stabilizer Reboilers 280 Duty, MMBtu/hr | 87.0 | 0.0 | −87.0 | 100.0% |
| Total Heating/Cooling, MMBtu/hr | 212.8 | 69.9 | −138 | 65.1% |

TABLE 16

Certain Improvements in Compressor Power Consumption for the System of FIG.
3 ("After Modification") Versus a Prior Art System ("Before Modification").

| Compression Power Consumption, hp | Before Modification | After Modification | Change | % Saving |
|---|---|---|---|---|
| ATM Compressor 170 motor power consumption, hp | 5,576 | 8,911 | 3,335.3 | −59.8% |
| LP Compressor 148 motor power consumption, hp | 10,023 | 5,918 | −4,105.7 | 41.0% |
| HP Compressor 116 motor power consumption, hp | 9,162 | 7,923 | −1,238.8 | 13.5% |
| Total compression power, hp | 24,761 | 22,752 | −2,009 | 8.1% |

TABLE 17

Additional Surprising and Unexpected Improvements in the System of FIG. 3
("After Modification") Versus a Prior Art System ("Before Modification").

| Product Quality Improvement | Before Modification | After Modification | Change | Benefits |
|---|---|---|---|---|
| Moisture Content of Produced Gas in Stream 142 to Gas Dehydration Plant, lb/MMSCF | 190 | 77 | −59.4% | Reduce design and operation cost of gas dehydration system |
| Produced Condensate and Water Content, ppmw | 483.17 | 334.75 | −30.7% | Reduce corrosion in pipeline by reducing moisture content |
| Export Crude at Stream 214, H$_2$S Content, ppmw | 10.04 | 56.07 |  | In spec, below 60 ppmw |
| Export Crude at Stream 214, API | 29.10 | 29.86 | 2.6% | Improve the API quality by over 2% leading to higher return |
| TVP at 140° F. at Stream 214, psia (Limit is 13 psia) | 8 | 11 |  | Below 13.0 psia |

Referring to the embodiment of FIG. 3, an online condensate moisture analyzer 161 is shown to detect and measure moisture content in stream 160 and is in communication with MPC 102 via signal 163. An online gas moisture analyzer 165 is shown to detect and measure moisture content in stream 142 and is in communication with MPC 102 via signal 167. Online moisture content analyzers are provided in the shipping condensate line to the fractionation plant and on the gas line to the gas plant and are used to measure and monitor the water content in condensate in ppmw. As shown in Table 17, the moisture analyzers show the embodiments of the present disclosure allow for reduced design and operation cost of gas dehydration systems and reduced corrosion in pipelines by reducing moisture content.

In embodiments disclosed here, innovative process control strategies are disclosed also utilizing the measurable transformer currents (amperes) to one or more desalter or dehydrator with insulated electrostatic electrodes to control the interface level and overcome the consequences of frequent interface level malfunction and failures. In one embodiment, current to one or more transformer is slowly increased with an increase of emulsion layer formation, for example in a dehydrator or desalter, and with an increase in the volume percentage of water in the emulsion layer. A higher water content in volume percent results in a higher current. In separation vessels with insulated electrostatic electrodes, voltage can reach 0 and current a maximum, beyond the inversion point of a water-in-oil emulsion at 65 to 75% water cut. This can cause short circuiting.

Parameters in an oil refinery or GOSP that can cause off-spec crude include: (1) low wash water injection rates (wash water rates should generally be maintained at between about 3 to 9 volume percent of a crude oil feed); (2) low demulsifier injection rates (typical injection rates range from between about 1 to 120 ppm of a crude oil feed); (3) low temperature (typical crude temperatures to desalter inlets are between about 110 to 200° F.); (4) malfunction of the electric grids and transformers (in present embodiments, voltage and electric can be used to monitor the electric grid); (5) poor mixing of the wash water and demulsifier with the crude (differential pressure across mixing valves can be used to change the mixing strength and efficiency); (6) high crude flow rates and lower residence times inside dehydrators and desalters (crude flow rate can be monitored and controlled); (7) injection of incompatible chemicals during oil well workovers and well flowback; (8) high inlet salt content in the crude oil; and (9) high water cut in the crude oil, for example greater than about 30% water by volume.

Any one of or any combination of the above challenges in crude oil processing can lead to high emulsion interface levels in desalters, which leads to voltage drops or increase in electric current and consequently short circuiting. Low voltage or high electric current in the desalters and dehydrators other than the design specification values can cause damage. Typical values are set by commercial desalter vendors. The rag layer (emulsion layer) in units such as desalters can be detected by interface level measurements like the interface level controllers of Agar Corporation or the Levelflex FMP55 guided wave radar. Capacitance technologies or nuclear type measurements can also be used to measure rag layer levels, but these measurements are unreliable and/or expensive. The interface level measurement can be enhanced using fully insulated electrostatic electrodes inside a 6" pipe spool. In embodiments disclosed here, the proposed pipe spool will simultaneously measure the level and destruct or break the emulsion.

In one embodiment, a closed loop controller is programmed and set in a DCS, where set process variables, for example in a GOSP or refinery, include salt content in PTB less than about 10 PTB and BS&W of less than about 0.2 volume percent in a dried, desalted crude oil product. In the closed loop controller, manipulated variables can include any one of or any combination of chemical demulsifier injection rate in ppm of a crude oil inlet, wash water rate volume percent of a crude oil inlet, desalter current and voltage, mixing valve pressure drop, separation vessel interface level (for a desalter or dehydrator), separation vessel water level, trim heater temperature, stabilizer reboiler temperature, and stripping gas application rate (if stripping gas is available or required for $H_2S$). Prediction models can be developed using artificial intelligence and historical data of GOSP or refinery. Model predictive controllers (MPC's) and multivariable controllers (MVC's) can be used to control dried, desalted crude oil product specifications below the set process variables of salt content in PTB less than about 10 PTB and BS&W of less than about 0.2 volume percent.

In some embodiments, inline electrostatic emulsion breakers, such as a 6" diameter spool of pipe fitted with insulated electrostatic electrodes for example, can be utilized to break a water-in-oil or oil-in-water emulsion before recycling it back to a crude charge pump's suction inlet. One or more of such an emulsion breaker prevents accumulation of emulsion in a desalter as a result of emulsion recirculation during long, continuous processing periods. The electric current and voltage supplied to the emulsion breaker can also be utilized to control the flow of the recycled emulsion.

Fully insulated electrostatic electrodes inside a 6" diameter pipe spool, for example, can be installed such that the inlet for an emulsion flow is at the center of the spool and the outlet is at the bottom of the spool (vertically lower) to avoid water accumulation inside the spool.

Feeding an emulsion layer stream into fully insulated electrodes inside a spool of pipe helps to break the emulsion. When the electrodes are 100% off, this means about 100% water cut is detected. Therefore, the inline emulsion breaker can also be used as indicator to troubleshoot and enhance the desalting process in combination with the salt-in-crude controller and the interface level. Drawn current can be used to measure the volume percentage of water in the emulsion. For example, greater current draw will indicate greater amount of emulsion, and low current draw will indicate a lesser amount of emulsion.

After proceeding through a separate inline emulsion breaker, a crude oil stream can be recycled back to one or more dehydrator and/or desalter inlet to ensure the full re-integration of the broken emulsion layer into the GOSP or refinery process, and to provide the heating from a trim heater to ensure the emulsion is broken. In some embodiments, one or more BS&W controller, optionally in combination with a current controller on the inline emulsion breaker, is used to manipulate the flow of the withdrawn emulsion from between about 1 to 30 gpm. The electric current supplied to the inline emulsion breaker can be utilized to control and override the BS&W analyzer to increase or decrease the flow of the recycled emulsion. Mixing efficiency between wash water and crude oil is important to embodiments of the present disclosure, and conventional mixing valves can provide more than 95% mixing efficiency, based on lab results. Mixing efficiency can be improved further by using the commercially available PROMiXX® and ProSalt™ (ProSep) mixers, for example vortex mixers.

Signals described throughout can be wired or wireless electronic signals proceeding one-way or two ways. In the embodiments shown, certain units are in one-way or two-way communication with an MPC exchanging data therebetween, and in other embodiments additional or fewer units could be in communication with an MPC, for example indirect wet-dry oil heat exchanger 210, trim heater 250 or similar valves and units displayed throughout the figures.

In some embodiments, hydrogen, nitrogen, steam, and/or other stripping gasses are applied to meet an $H_2S$ crude specifications of 10 ppm, optionally using a crude oil stabilizer with 16 actual trays along with steam injection.

In embodiments disclosed here, when fresh wash water is applied in addition to or alternative to recycle wash water, a suitable volume/volume ratio for water to crude oil and hydrocarbons is between about 1 V % to about 9 V %. A lesser V/V wash water to oil and hydrocarbons is used when the salt content is less than 1,000 ppm. With greater salt content in wash water, a greater volume is used. For example, V/V for recycle water as wash water to crude oil and hydrocarbons is between about 4 V % or 5 V % to about 9 V %.

Heat exchangers, such as trim heat exchangers, can include any one of or any combination of indirect heat exchangers such as shell and tube heat exchangers. Desalted, dried crude oil for shipment in some embodiments meets specifications including the following: (1) a salt concentration of not more than about 10 PTB; (2) BS&W of not more than about 0.3 V %; (3) $H_2S$ content of less than about 60 ppm in the crude stabilization tower (or degassing vessels in the case of sweet crude); and (4) a maximum RVP of about 7 psia and a maximum TVP of about 13.5 psia at 130° F.

Prior art GOSP systems also suffer from the following issues: transformer tripping and inefficient energy usage; off-specification crude oil production in terms of BS&W and salt content; high operating costs required to meet the crude specifications; and inefficient human and manual operations. Certain prior art treatments are limited to treating crude oil with a low water cut (approximately 30% by volume), while water cut in certain emulsion layers can reach as high as about 85% for tight emulsions in heavy crude oil applications. Suitable insulated electrostatic electrodes are capable of handling up to 100% water cut herein without short circuiting, and this enhances the emulsion breaking capabilities of separation vessels. Limiting and treating the emulsion rag layer will avoid off-specification crude oil products and minimize demulsifier and wash water consumption. In embodiments of the disclosure, systems and methods enable the efficient control, reduction, in addition to or alternative to elimination of the rag layer. Embodiments of the disclosure can separate up to about 90% of the water content in the rag layer depending on operating temperature, crude type, electrostatic coalescers and demulsifier used, or alternatively up to about or greater than about 95% of the water content in the rag layer.

The emulsion layer can consist of water, oil, and solids. Subjecting the emulsion layer to high voltage electric fields will result in water droplets being distorted into an elliptical shape, with positive charges accumulating at the end nearest the negative electrode of the external electric field, and negative charges at the end nearest the positive electrode. The drops become induced dipoles. Two adjacent droplets in the field will have an electrical attraction for one another. The negative end of one droplet is nearest the positive end of the neighboring droplet, so there is an attractive force between the two that tends to draw them together. This force is of sufficient magnitude to rupture the interfacial film between the droplets upon collision, and allows them to coalesce into one larger droplet. The resulting larger water droplets (globules), along with water-insoluble solids, settle to the bottom of a vessel or pipe.

For purposes of the present disclosure, tight emulsion crude oil includes emulsions that occur in medium to heavy crude oils with American Petroleum Institute (API) numbers less than about 29. Crude oil specific gravity, along with API numbers, can be used as a measure of crude oil quality. Higher API values indicate lighter oils and, thus, a higher market value. Water cut in oil production refers to the total volume of water in the crude oil stream divided by the total volume of crude oil and water, or water cut percent=total volumetric flowrate of water/(volumetric flowrate of water+volumetric flowrate of crude oil)*100. Water cut increases with oil and gas well age during continuous production of oil and gas wells. Water cut at the beginning of the well life can be around zero percent and can reach close to 100% by the end of the life of the well. "Wet" crude oil normally has more than about 0.3 volume percent of water while "dry" crude has less than 0.3 volume percent water.

Insulated electrostatic electrodes can be similar to those of Wartsila Corporation of Helsinki, Finland produced under the term Vessel Internal Electrostatic Coalescers (VIEC). Another supplier of suitable electrodes would include Cameron International Corporation (a Schlumberger Company) of Houston, Tex. Emulsion separation vessel technology described in U.S. Pat. No. 10,513,663 is suitable in certain embodiments of the present disclosure and is incorporated here by reference in its entirety. Fully-insulated electrostatic electrodes are capable of handling up to 100% water cut, and the electrodes can be fully deactivated at about 100% water cut.

Typically, wash water salinity ranges from about 100 ppmw to about 12,000 ppmw salt in embodiments of the present disclosure. Wash water will be more effective at lower salinity. Formation water salinity inside crude oil can reach as high as 270,000 ppmw of salt content. Demulsifiers, or emulsion breakers, are chemicals used to separate emulsions (for example oil-in-water emulsions). Some commercially available demulsifiers are Petrolite DMO-22241 by Baker Petrolite, Emulsotron CC-8948 by Champion Technologies, SUGEST 9005 by German Metal Surface Treatment Chemical Co., Clariant Phasetreat 4688 by Clariant, or any other suitable demulsifier.

A desalter operating pressure can be greater than about 35 psig, depending on the vapor pressure of the fluid inside the desalter. Crude oil fed to a desalter is required to be below its bubble point to ensure no free vapor is liberated in the process. Desalters are designed to be 'gas free,' since the presence of vapor in a high voltage field can cause arcing which in turn leads to more vapor formation. Desalters can operate at about 25 psig higher than the fluid vapor pressure to avoid vaporization inside the desalters and potential arcing.

In integrated GOSP systems and processes of the present disclosure, a wet and unstabilized crude oil from oil production wells, either or both onshore or offshore, for example at about 63° F., or between about 40° F. and 80° F., enters through an inlet.

Some embodiments of desalters can include one or more cyclonic separator, for example at the inlet, to separate components of a mixed inlet stream.

The plurality of fully-insulated electrostatic electrodes can simultaneously dehydrate crude oil and remove emulsified water, for example up to 98% of emulsified water. Fresh wash water can be used in the desalting processes to ensure that the maximum amount of salt is rinsed from the crude oil. Injecting low salinity water before heat exchangers aids in minimizing fouling.

Heating crude makes it easier to separate out gas and enhance the desalting efficiency. Electrostatic coalescence removes the remaining water emulsion from the crude oil eliminating the need for 2nd stage desalters, in some embodiments.

Wet crude oil generally contains some free salty water, and salty water in the form of an emulsion. The emulsion is separated into layers of oil and water by electrostatic coalescence. Electrostatic coalescence applies an electric current, causing water droplets in an emulsion to collide, coalesce into larger (heavier) drops, and settle out of the crude oil as separate liquid water. This process partially dries wet crude oil.

Stabilization is a process carried out using heating to remove any remaining dissolved gases, light, volatile hydrocarbons, and $H_2S$. Crude oil is hence split into two components: atmospheric gas from the overhead, and stabilized, sweetened crude oil from the bottoms, for example at a cold stabilizer product bottom stream. Stabilizing crude oil is achieved when crude oil is heated in a multiple stages of separation drums working at increasing temperatures and reduced pressure.

A cold stabilizer performs two functions simultaneously by sweetening sour crude oil by removing the hydrogen sulfide, and reducing the vapor pressure through removal of light, volatile hydrocarbons, thereby making the crude oil safe for shipment in pipelines. Stabilization involves the removal of light ends from crude oil, mainly $C_1$-$C_4$ hydrocarbons, to reduce the vapor pressure to produce dead or stable product that can be stored in an atmospheric tank. Stabilization aims to lower vapor pressure of crude oil to a maximum RVP of about 7 psia and a maximum TVP of about 13.5 psia at 130° F., or in other words low enough so no vapor will flash under atmospheric conditions, making it safe for transportation and shipment. Operating conditions of a stabilizer, such as for example a cold stabilizer, include temperature in a range from about 160° F. to about 200° F. and pressure from about 3 psig to about 5 psig.

In some applications in Saudi Arabia, crude oil grade is measured by the American Petroleum Institute (API) range as follows: Arabian Super Light (49-52 API); Arabian Extra Light (37-41 API); and Arabian Light (32-36 API). API=141.5/(crude oil specific gravity)−131.5.

Wet crude oil as used in the specification generally refers to crude oil having more than about 0.3 volume percent of water, while dry crude oil has less than about 0.3 volume percent of water. The phrase lighter hydrocarbons as used throughout the specification refers generally to $C_{1-4}$ components such as, for example, methane, ethane, propane, butane, iso-butane, and trace amounts of $C_{5+}$ compounds. The phrase heavier hydrocarbons as used in the specification refers generally to $C_{5+}$ or five-carbon and greater hydrocarbons such as, for example, pentane, is-pentane, hexane, and heptane. Heavier hydrocarbons can have trace amounts of lighter hydrocarbons.

Operating conditions of a desalter such as desalter can include a temperature range from about 130° F. to about 160° F. and a pressure at about 25 psig above the crude vapor pressure.

Second stage desalters are not required in certain embodiments of the present disclosure. Sweetening involves the removal of dissolved $H_2S$ gas from crude oil to meet specifications in a range of about 10-60 ppm $H_2S$. Sweetening is performed to reduce corrosion to pipelines and eliminate health and safety hazards associated with $H_2S$. Steam can be used to strip $H_2S$ gas from crude oil in addition to or alternative to any other suitable stripping gas that is low in $H_2S$ concentration relative to the crude oil. Suitable stripping gas streams include natural gas low in $H_2S$ concentration (such as methane and ethane), steam, and nitrogen ($N_2$).

Demulsifiers enhance desalting processes and allow treatment of "tight" emulsions. Also referred to as emulsion breakers, demulsifiers are chemicals used to separate emulsions such as, for example, water in oil. For example, one such demulsifier is PHASETREAT® by Clariant of Muttenz, Switzerland.

Efficient inlet mixing devices and cyclonic separators can improve the separation of gas and liquid in vessels such as a desalter, or in separation vessels preceding a desalter.

Inline gas separators include compact gas/liquid separators that apply cyclonic separation techniques to generate high gravitational forces ("G-Forces") with a low pressure drop to achieve high separation performance of gas from liquid in a pipe spool. Inline separators can be considered as one equilibrium separation stage, and produce very high quality separate gas and liquid streams.

Although the disclosure has been described with respect to certain features, it should be understood that the features and embodiments of the features can be combined with other features and embodiments of those features. Certain units not shown such as heat exchangers, compressors, valves, off-gas vents, and other will be understood to apply as needed by those of ordinary skill in the art.

Although the disclosure has been described in detail, it should be understood that various changes, substitutions, and alterations can be made hereupon without departing from the principle and scope of the disclosure. Accordingly, the scope of the present disclosure should be determined by the following claims and their appropriate legal equivalents.

The singular forms "a," "an," and "the" include plural referents, unless the context clearly dictates otherwise. The term "about" in some embodiments includes values 5% above or below the value or range of values provided.

As used throughout the disclosure and in the appended claims, the words "comprise," "has," and "include" and all grammatical variations thereof are each intended to have an open, non-limiting meaning that does not exclude additional elements or steps.

As used throughout the disclosure, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present disclosure.

While the disclosure has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present disclosure may suitably comprise, consist or consist essentially of the elements disclosed and may be practiced in the absence of an element not disclosed.

What is claimed is:

1. An integrated gas oil separation plant system, the system comprising:
   a crude oil inlet feed stream;
   an inline cyclonic separator, wherein the inline cyclonic separator is fluidly coupled to the crude oil inlet feed stream and is operable to separate gas from crude oil in the crude oil inlet feed stream;
   a first indirect heat exchanger fluidly coupled to the inline cyclonic separator to heat the crude oil in the crude oil inlet feed stream;
   a second indirect heat exchanger fluidly coupled to the first indirect heat exchanger to heat the crude oil in the crude oil inlet feed stream;
   a direct mixer device fluidly coupled to the second indirect heat exchanger to mix compressed atmospheric pressure gas directly with the crude oil in the crude oil inlet feed stream;
   a low pressure production trap (LPPT), where the LPPT is fluidly coupled to the direct mixer device;
   a low pressure degassing tank (LPDT), where the LPDT is fluidly coupled to the LPPT;
   an atmospheric pressure off-gas compressor fluidly coupled to the LPDT to compress off-gas from the LPDT for production of the compressed atmospheric pressure gas for the direct mixer device;
   a low pressure off-gas compressor fluidly coupled to the LPPT to compress off-gas from the LPPT for production of compressed low pressure gas for use in heating in the second indirect heat exchanger;
   a high pressure off-gas compressor fluidly coupled to the inline cyclonic separator to compress off-gas from the inline cyclonic separator for production of compressed high pressure gas for use in heating in the first indirect heat exchanger; and
   a low pressure knockout drum (KOD) fluidly coupled to the second indirect heat exchanger and fluidly coupled to the high pressure off-gas compressor to accept cooled gases from the second indirect heat exchanger, to remove gas condensates and water from the cooled gases from the second indirect heat exchanger, and to supply gas to the high pressure off-gas compressor.

2. The system according to claim 1, further comprising a high pressure KOD fluidly coupled to the first indirect heat exchanger to accept cooled gases from the first indirect heat exchanger, to remove gas condensates and water from the cooled gases from the first indirect heat exchanger, and to supply gas to a natural gas treatment facility.

3. The system according to claim 1, wherein the atmospheric pressure off-gas compressor is further fluidly coupled to a crude oil stabilizer with reboilers to accept atmospheric off-gas from the crude oil stabilizer.

4. The system according to claim 1, wherein the atmospheric pressure off-gas compressor is further fluidly coupled to a treated crude oil export product tank to accept atmospheric off-gas from the treated crude oil export product tank.

5. The system according to claim 1, wherein the atmospheric pressure off-gas compressor is further fluidly coupled to a crude oil stabilizer without reboilers and with stripping gas injection to accept atmospheric off-gas from the crude oil stabilizer without reboilers and with stripping gas injection.

6. The system according to claim 5, where the stripping gas injection stream is operable to supply steam in addition to or alternative to an additional stripping gas of reduced $H_2S$ concentration relative to crude oil in the crude oil stabilizer, where the stripping gas stream is operable to lower concentration of $H_2S$ in crude oil in the crude oil stabilizer.

7. The system according to claim 1, where the system is operable to refine crude oil in the crude oil inlet feed stream to produce a refined crude oil product for storage and shipment meeting the following specifications: (1) a salt concentration of not more than about 10 pound (lbs.) of salt/1000 barrels (PTB); (2) basic sediment and water (BSW) of not more than about 0.3 volume percent (V %); (3) $H_2S$ concentration of less than about 60 ppm; and (4) a maximum RVP of about 7 pounds per square inch absolute (psia) and a maximum true vapor pressure (TVP) of about 13.5 psia at 130 degrees Fahrenheit (° F.).

8. The system according to claim 1, further comprising a multi-variable prediction controller operable to control variables selected from the group consisting of: demulsifier injection rate; wash water injection rate; wash water recycle rate; LPPT temperature; LPPT pressure; LPPT oil-in-water emulsion level; LPDT temperature; LPDT pressure; and LPDT oil-in-water emulsion level; and
where the system is operable to refine crude oil in the crude oil inlet feed stream to produce a refined crude oil product for storage and shipment meeting the following specifications: (1) a salt concentration of not more than about 10 pound (lbs.) of salt/1000 barrels (PTB); (2) basic sediment and water (BSW) of not more than about 0.3 volume percent (V %); (3) $H_2S$ concentration of less than about 60 ppm; and (4) a maximum RVP of about 7 pounds per square inch absolute (psia) and a maximum true vapor pressure (TVP) of about 13.5 psia at 130 degrees Fahrenheit (° F.).

9. The system according to claim 1, where the operating pressure within the LPPT is greater than operating pressure in the LPDT.

10. The system according to claim 1, further comprising a crude oil charge pump, a trim heater, and a desalter following the LPDT and in fluid communication with the LPDT.

11. The system according to claim 1, wherein the operating pressure of the inline cyclonic separator is between about 50 psig and about 150 psig greater than the operating pressure of the LPPT.

12. The system according to claim 1, wherein the LPPT and LPDT comprise an inlet cyclonic separator, insulated electrostatic electrodes, and a weir, wherein oil-in-water emulsions are disposed proximate the weirs during operation.

13. The system according to claim 1, wherein the compressors do not require after coolers.

14. An integrated gas oil separation plant system, the system comprising:
a crude oil inlet feed stream;
an inline cyclonic separator, wherein the inline cyclonic separator is fluidly coupled to the crude oil inlet feed stream and is operable to separate gas from crude oil in the crude oil inlet feed stream;
a first indirect heat exchanger fluidly coupled to the inline cyclonic separator to heat the crude oil in the crude oil inlet feed stream;
a second indirect heat exchanger fluidly coupled to the first indirect heat exchanger to heat the crude oil in the crude oil inlet feed stream;
a direct mixer device fluidly coupled to the second indirect heat exchanger to mix compressed atmospheric pressure gas directly with the crude oil in the crude oil inlet feed stream;
a low pressure production trap (LPPT), where the LPPT is fluidly coupled to the direct mixer device;
a low pressure degassing tank (LPDT), where the LPDT is fluidly coupled to the LPPT;
an atmospheric pressure off-gas compressor fluidly coupled to the LPDT to compress off-gas from the LPDT for production of the compressed atmospheric pressure gas for the direct mixer device;
a low pressure off-gas compressor fluidly coupled to the LPPT to compress off-gas from the LPPT for production of compressed low pressure gas for use in heating in the second indirect heat exchanger;
a high pressure off-gas compressor fluidly coupled to the inline cyclonic separator to compress off-gas from the inline cyclonic separator for production of compressed high pressure gas for use in heating in the first indirect heat exchanger; and
a high pressure KOD fluidly coupled to the first indirect heat exchanger to accept cooled gases from the first indirect heat exchanger, to remove gas condensates and water from the cooled gases from the first indirect heat exchanger, and to supply gas to a natural gas treatment facility.

15. An integrated gas oil separation plant system, the system comprising:
a crude oil inlet feed stream;
an inline cyclonic separator, wherein the inline cyclonic separator is fluidly coupled to the crude oil inlet feed stream and is operable to separate gas from crude oil in the crude oil inlet feed stream;
a first indirect heat exchanger fluidly coupled to the inline cyclonic separator to heat the crude oil in the crude oil inlet feed stream;
a second indirect heat exchanger fluidly coupled to the first indirect heat exchanger to heat the crude oil in the crude oil inlet feed stream;

a direct mixer device fluidly coupled to the second indirect heat exchanger to mix compressed atmospheric pressure gas directly with the crude oil in the crude oil inlet feed stream;

a low pressure production trap (LPPT), where the LPPT is fluidly coupled to the direct mixer device such that the direct mixer device is upstream of the LPPT and downstream of the second indirect heat exchanger;

a low pressure degassing tank (LPDT), where the LPDT is fluidly coupled to the LPPT;

an atmospheric pressure off-gas compressor fluidly coupled to the LPDT to compress off-gas from the LPDT for production of the compressed atmospheric pressure gas for the direct mixer device;

a low pressure off-gas compressor fluidly coupled to the LPPT to compress off-gas from the LPPT for production of compressed low pressure gas for use in heating in the second indirect heat exchanger; and a high pressure off-gas compressor fluidly coupled to the inline cyclonic separator to compress off-gas from the inline cyclonic separator for production of compressed high pressure gas for use in heating in the first indirect heat exchanger.

\* \* \* \* \*